(12) United States Patent
Ecer

(10) Patent No.: US 7,790,332 B2
(45) Date of Patent: Sep. 7, 2010

(54) FUEL CELLS AND METHODS OF MANUFACTURING THE SAME

(75) Inventor: Gunes M. Ecer, Irvine, CA (US)

(73) Assignee: Appliedus Corporation, Irvine, CA (US)

( * ) Notice: Subject to any disclaimer, the term of this patent is extended or adjusted under 35 U.S.C. 154(b) by 0 days.

(21) Appl. No.: 11/807,643

(22) Filed: May 31, 2007

(65) Prior Publication Data

US 2008/0003481 A1 Jan. 3, 2008

Related U.S. Application Data

(60) Provisional application No. 60/818,401, filed on Jul. 3, 2006, provisional application No. 60/875,102, filed on Dec. 16, 2006.

(51) Int. Cl.
*H01M 8/00* (2006.01)
*H01M 8/02* (2006.01)
*H01M 8/10* (2006.01)
*H01M 4/04* (2006.01)

(52) U.S. Cl. ............... 429/535; 429/408; 429/482; 429/488

(58) Field of Classification Search ........... 429/30, 429/32–35, 38, 40, 44; 428/304.4; 427/115; 423/447.3, 651; 502/182; 264/618; 156/89.12
See application file for complete search history.

(56) References Cited

U.S. PATENT DOCUMENTS 4,038,462 A * 7/1977 Rohr ..................... 429/30
5,219,682 A * 6/1993 Bones et al. ............. 429/320
5,445,903 A * 8/1995 Cable et al. .............. 429/33
6,361,893 B1 3/2002 George et al.
6,835,488 B2 12/2004 Sasahara et al.
7,094,489 B2 8/2006 Shinn et al.
2002/0086203 A1* 7/2002 Nobuta et al. ............ 429/101
2004/0202924 A1* 10/2004 Tao et al. ................ 429/102
2005/0019636 A1* 1/2005 Kwon et al. .............. 429/32
2005/0112056 A1* 5/2005 Hampden-Smith et al. .. 423/651
2006/0067872 A1* 3/2006 Kim et al. ............. 423/447.3
2006/0257714 A1* 11/2006 Sato et al. ............... 429/40

OTHER PUBLICATIONS

Hong et al. ("Oxidative Coupling of Methane Over Calcium Chloride-Promoted Calcium Chlorophosphate," Applied Catalysis A: General, 2001, 205, 253-262.).*

* cited by examiner

*Primary Examiner*—Dah-Wei D Yuan
*Assistant Examiner*—Claire L Rademaker
(74) *Attorney, Agent, or Firm*—William W. Haefliger

(57) ABSTRACT

A fuel cell, comprising an electrolyte body and, embedded within it, at least two separate electrodes capable of conducting electrons; the electrodes being sufficiently porous to allow gas flow through them; one electrode being an electrically negative anode and the other electrode being an electrically positive cathode, and the electrolyte body being capable of carrying charged particles between the anode and cathode; the anode and cathode being electrically connected to form an electrical circuit.

28 Claims, 8 Drawing Sheets

FUEL CELLS AND METHODS OF MANUFACTURING THE SAME

The present invention claims priority to U.S. Provisional Patent Application No. 60/818,401, filed Jul. 3, 2006, and U.S. provisional Patent Application No. 60/875,102, filed Dec. 16, 2006, each of which are specifically herein incorporated by reference in their entirety.

BACKGROUND OF THE INVENTION

The present invention is directed towards fuel cells. More specifically, the invention is a type of fuel cell wherein the ionic conduction medium is also the body of the cell. In one embodiment, ionic conduction medium is created by a chemical reaction while the fuel cell is manufactured. The manufacturing process, used to create the cell body, can also manufacture the electrodes, fuel and oxidant gas transmission lines, and if necessary, place catalysts in proper locations within the cell.

BACKGROUND AND PRIOR ART

Fuel cells generate electricity from a reaction between oxygen and hydrogen. Several different types of fuel cell that exist presently are all based around a central design, which consists of two electrodes, a negative anode and a positive cathode. These are separated by a solid or liquid electrolyte that carries electrically charged particles between the two electrodes. A catalyst, such as platinum, is often used to speed up the reactions at the electrodes. Hydrogen fuel cells produce electricity, with water and heat produced as by products. They can provide energy for systems as small as a cell phone, and as large as a utility power station. Their benefits over conventional combustion-based technologies, currently used in many power plants and passenger vehicles, include production of much smaller quantities of greenhouse gases and none of the air pollutants that cause illness. If pure hydrogen is used as fuel, fuel cells emit only heat and water as byproduct.

Fuel cells are commonly classified according to the nature of the electrolyte. Each type requires particular materials and fuels and is suitable for different applications.

A more common type is called the proton exchange membrane fuel cell (PEMFC), also known as polymer electrolyte membrane fuel cell. In PEMFC, the electrolyte is a thin polymer membrane such as Nafion, ™ or, poly[perfluorosulphonic] acid, which allows protons to diffuse through, but does not conduct electrons. At the anode hydrogen molecule gives up its electron, and the resulting hydrogen ion (proton) diffuses across the membrane towards the cathode, where it combines with oxygen ions. Electrons flow through an external circuit and provide power. Oxygen, in the form of air, is supplied to the cathode and this combines with the electrons and the hydrogen ions to produce water.

PEM cells operate at a temperature of around 80° C. This temperature is too low for high speed splitting of hydrogen and oxygen into ions, so a thin layer of platinum (or some other material) on each electrode typically catalyses the reactions. The two electrodes and the electrolyte define a unit, which is called a membrane electrode assembly (MEA), and it is sandwiched between two field flow plates to form a fuel cell. Flow plates contain grooves to channel the fuel to the electrodes and also conduct electrons out of the assembly.

Each fuel cell produces enough power to run a light bulb (about 0.7 volts). But, for cars, for example, around 300 volts needed. To produce such high voltages, several individual cells are typically combined in series to form a fuel cell stack. At present, a number of PEMFC demonstration units are in operation. There are a number of barriers to their wider use. The main issue is cost as the membrane materials and catalysts are expensive, and also they need pure hydrogen to operate, as they are very susceptible to poisoning by carbon monoxide and other impurities.

Alkali fuel cell (AFC) is another fuel cell design. AFC is similar to that of a PEM cell, and operates at similar temperatures (80° C.) but with an aqueous solution or stabilized matrix of potassium hydroxide as the electrolyte. Unlike in PEMFC, hydroxyl ions (OH$^-$) migrate from the cathode to the anode where they react with hydrogen to produce water and electrons. These electrons create external energy, and return to the cathode to react with oxygen and water to produce more hydroxyl ions.

AFC power density is about ten times lower than that of a PEM cell so they are too bulky for use in car engines.

The phosphoric acid fuel cell (PAFC) uses liquid phosphoric acid as the electrolyte, usually contained in a silicon carbide matrix. Phosphoric acid cells work at around 150 to 200° C. —and still need platinum catalysts on the electrodes to increase reactivity. The anode and cathode reactions are the same as those in the PEMFC. PAFC operates at lower efficiency than the other fuel cells.

Molten carbonate fuel cells (MCFC) work quite differently using either molten lithium potassium or lithium sodium carbonate salts as the electrolyte. When heated to around 650° C. these salts melt and generate carbonate ions, which flow from the cathode to the anode where they combine with hydrogen to give water, carbon dioxide and electrons.

Solid oxide fuel cells (SOFC) need even higher temperatures than molten carbonate cells to function. They use a solid ceramic electrolyte, such as zirconium oxide stabilized with yttrium oxide, and operate at temperatures of 800-1,000° C. Lower operating temperatures are achieved by reducing thickness of the ceramic membrane. At present, the thinnest membranes are about 20 µm.

In these fuel cells, energy is generated by the diffusion of oxygen anions from the cathode to the anode, where they combine with the fuel, which is typically a mixture of hydrogen and carbon monoxide. Both of these gases can be oxidized to generate energy. The electrons liberated at the anode go through an external circuit back to the cathode where they reduce the incoming oxygen in air, and oxygen ions are generated again, and this completes the cycle. Solid oxide fuel cells, though have high fuel efficiencies, are expensive because of the cost of materials that must withstand high temperatures and thermal cycling.

There are other fuel cell designs that are still in early stages of their development. These include, direct methanol fuel cells (DMFC), a variant of the PEMFC, which uses methanol directly; and regenerative fuel cells (RFC). Aside from generating electricity an RFC performs the reverse reaction to separate water into hydrogen and oxygen, which are then fed back to the fuel cell.

Regardless of the type, the biggest drawback for commercialization of existing fuel cells is their high cost. This high cost is a result of several factors, which include:

1. low reaction surface area per unit volume,
2. high materials cost, partly due to their frequent failure under cyclic thermal loading and/or corrosive environment, and
3. the very thin electrolytes, electrodes, and flow plates are too difficult to manufacture.

Often, separately manufactured flat electrolyte membrane is sandwiched between separately manufactured flat porous electrodes to manufacture an electrode-membrane assembly (EMA). In the process of putting the three flat pieces together membrane frequently gets damaged, and loses its functional character. To this assembly, a pair of field flow plates to carry the gasses are attached, again requiring a separate manufacturing step, and exposing the assembly to manufacturing induced defects, and increasing manufacturing cost. Stacks of cells are then put together to manufacture a large enough fuel cell to function in the real world.

Using deposition techniques to deposit some of these parts and then sintering to bond them eliminate the manufacturing step of assembling them, but the large numbers of manufacturing steps still remain, and are necessary to create a fuel cell stack.

In all conventional fuel cells described above, the key component is the electrolyte, which must not conduct electricity, but conduct charged particles such as protons and oxygen ions.

Fuel cell costs would be drastically reduced if fuel cell efficiency were to be increased, so that much less materials would be needed to construct them; secondly, if operating temperatures could be reduced while still providing highly efficient and low-cost fuel cell; and thirdly, if fuel cell stacks were manufactured all at once as complete fuel cells are manufactured, thus reducing the total manufacturing steps to a few steps. This invention provides all of these improvements in fuel cells.

This invention also provides solid fuel cell membranes with pores that offer higher charged particle transport rates, thus improving efficiency of fuel cell reactions. Additionally, a simpler method of manufacture of solid oxide membrane fuel cells is made available. The manufacturing method occurs at lower temperatures, allowing easier control.

Presently, electrolyte membranes for the Solid Oxide Fuel Cells (SOFC) are manufactured by sintering or by hot pressing at very high temperatures, which increase the manufacturing cost. This invention offers a lower temperature alternative to solve this problem.

Above mentioned drawbacks of the prior art and others are overcome by the novel fuel cell design and the processes of this invention, which are capable of manufacturing fuel cells that can be, at least, an order of magnitude more efficient than any of the existing fuel cells. The basic manufacturing process that is invented here solves all of the manufacturing and cost related problems and deficiencies associated with the prior art.

SUMMARY OF THE INVENTION

An object of this invention is to provide very high efficiency fuel cells by providing very high reaction surface area per unit volume, and by reducing the thickness of electrolyte, through which ions must be transported.

Another object of this invention is to reduce cost of obtaining energy by the use of a low-cost fuel cell manufacturing method, and very high efficiency fuel cells.

Another object of this invention is to reduce the time, energy, materials, and cost of manufacturing fuel cell stacks.

A further object of this invention is to make fuel cells more robust and less prone to problems due to deviations in temperature and less prone to breakdowns due to thermal expansion mismatch of construction materials.

A further object of this invention is to provide lower cost solid oxide electrolyte hydrogen fuel cells by manufacturing the electrolyte at lower temperatures.

The novel fuel cell design offered consists of a stack of rows closely spaced porous electrodes, acting also as channels for gaseous reactants, each alternately carrying fuel gas and oxygen containing gas, separated by a very thin electrolyte, which is a continuous medium produced in dimensions sufficient to create desired electrical energy; said medium may also act as load carrying construction material.

The novel manufacturing process of this invention can manufacture extremely high efficiency fuel cells, by allowing very thin electrolyte, as thin as several tens of nanometers, between electrode/channels, which can be as small as several tens of nanometers in diameter, thus allowing very high reaction area per unit volume to be achieved. The process of this invention can simultaneously manufacture a fuel cell stack with its electrodes to carry electrons, the necessary catalysts at or near the electrode-electrolyte interfaces, fuel supply lines, and exhaust lines all at once, while the electrolyte material becomes the continuous fuel cell construction medium, within which all fuel cell components are placed in close proximity.

Because the electrolyte thickness between electrodes can be reduced significantly, ionic transport rate can speed up across the electrolyte, and do not require as high temperatures as its conventional counterparts to achieve the same ionic transport rates. Since the electrolyte "membrane" thickness as well as fuel and oxygen carrying electrode/channel dimensions are reduced significantly, reaction surface area per unit volume of cell is increased many fold. This then increases the efficiency of reactions producing energy, and significantly reduces the fuel cell volume per unit current output.

To manufacture SOFC electrolyte at lower temperatures, metal of the oxide, for example zirconium metal in the zirconium oxide, would be used to construct the fuel cell at a lower manufacturing temperature, and the metal could then be oxidized to form zirconium oxide. Defect concentration of zirconium oxide may then be controlled to increase rate of charged particle (oxygen ion) transport across it.

In one embodiment, the process consists of first distributing in a layer by layer fashion, according to a predetermined design pattern, fine-grained powder particles of electrode, catalysts materials, and a high vapor pressure material powder within a matrix of electrolyte powder; secondly, consolidating the powder composite under pressure at an elevated temperature to cause the matrix to bond to a near theoretical density compact, and finally heating the dense compact to a temperature sufficient to cause the high vapor pressure particles to evaporate and form gas flow channels within electrodes distributed within the electrolyte matrix. Here, the high vapor pressure material may be chosen to condense as a continuous electrode within each channel, or by a second heating process, electrode powder material, now within channels, may be made to melt to form a continuous conduction path, or high vapor pressure material particles embedded in the consolidated electrode material upon heating to above vaporization temperatures could expand and cause the electrode material to grow into a porous electrode and simultaneously create a tortuous path for reaction gases, or similar methods of electrode and gas flow channel creation. Catalyst material is also incorporated into the electrode material similarly; first as an addition to the electrode-high vapor pressure material powder mixture, and upon consolidation of the powders, catalyst material particles remain embedded in the consolidated porous electrode material.

In another embodiment of this invention, pores are created inside the electrolyte membrane to increase transport rates across the electrolyte. The increase in transport rate, thus increase in electricity flux, is possible because pores, which would typically be under vacuum, short-circuit the charged particle diffusion path by providing voids into which charged gas atoms could evaporate, reducing the effective electrolyte membrane thickness. The membranes of this invention can be any type of solid membrane used in fuel cells, such as polymer and solid oxide membranes.

A reservoir of charged particles, protons or oxygen ions, collects inside pores, and thus, shortens the distance the charged particles must travel to reach the other side, reducing the time required for initial startup of fuel cell. The reservoirs of protons inside the polymer electrolyte membrane for example, can shorten the time needed for the fuel cell to operate at full flux starting from zero.

Incorporating high volatility material particles inside the electrolyte matrix can create pores inside electrolyte material upon heating to the vaporization temperature or to a temperature above the temperature, where significant vaporization of these particles can occur. Pores can be created using conventional techniques as well.

To manufacture solid oxide fuel cell (SOFC) electrolyte at lower temperatures, metal of the oxide membrane, for example zirconium metal in the zirconium oxide membrane, is used to construct the solid membrane structure from zirconium metal at a lower manufacturing temperature, and the metal is then oxidized to form zirconium oxide to impart the electrolyte characteristics. Adjusting the fraction of the excess metal remaining, after oxidation of zirconium, may then control defect concentration of zirconium oxide. In this way the rate of charged particle (oxygen ion) transport across the solid oxide electrolyte can be increased.

For increased reaction efficiencies, the novel three-dimensional fuel cell design provides a stack of rows of closely spaced electrodes/channels, each set of electrode/channel rows, alternately carrying fuel gas and oxygen containing gas; electrodes within hydrogen and oxygen carrying channels being connected to form two separate electrode systems; and, all within a matrix of electrolyte material, which is a continuous medium produced in dimensions sufficient to create desired electrical energy; said medium may also act as load carrying fuel cell construction material. Electrolyte material can be any conventionally used electrolyte material, can have short-circuit pores for increased efficiency; or solid oxide electrolyte first manufactured by using the metallic element and later oxidized to create the oxide electrolyte.

Because the transport rates of charged particles across the electrolyte can be increased significantly, initial minimum operational temperature of the fuel cells of this invention can be lower than the conventional fuel cells. Since the electrolyte "membrane" thickness, or its effective thickness, as well as fuel and oxygen carrying channel dimensions are reduced significantly, reaction surface area per unit volume of cell is increased many fold. This then increases the efficiency of reactions producing energy, and significantly reduces the fuel cell volume.

Thus, this invention offers long lasting fuel cells potentially hundreds of times more powerful than any of the existing fuel cells, at lower prices, and with more reliability.

DETAILED DESCRIPTION

Figure 1:
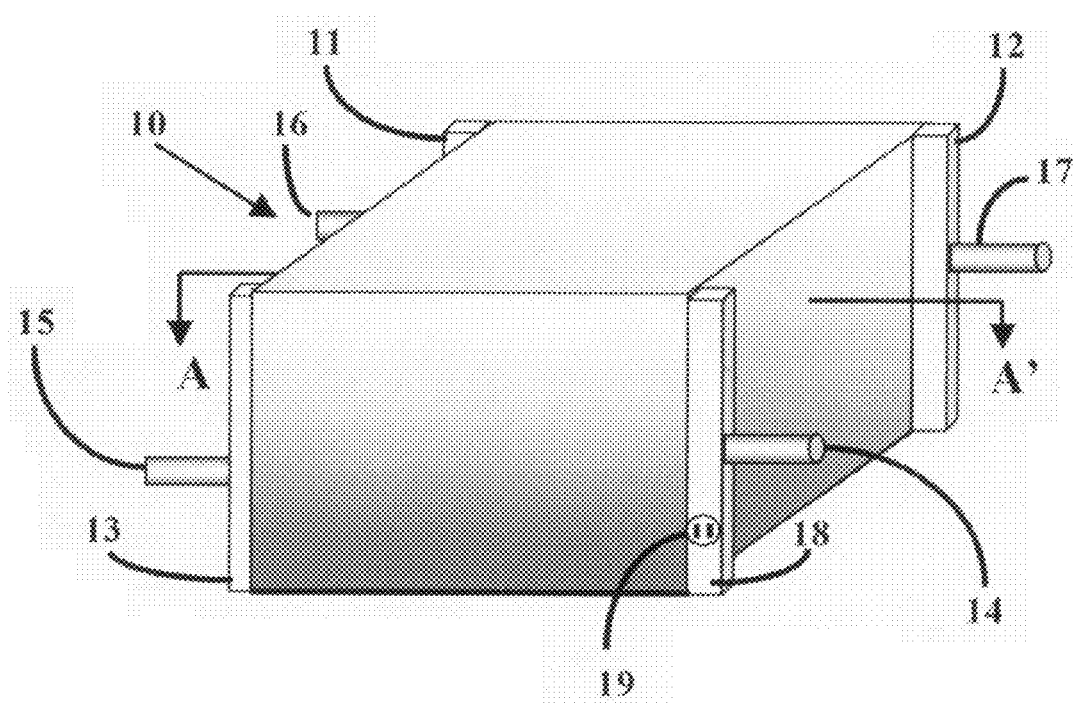
FIG. 1 is a plan view of a complete, ready to be used hydrogen fuel cell power system.

A fuel cell is a device that uses hydrogen (or hydrogen-rich fuel) and oxygen to create electricity. Components of a single fuel cell include two electrodes, which act as porous anode and cathode, each with or without a coating of a catalyst. The need for a catalyst is reduced with increasing reaction temperature. Between the two electrodes there is an electrolyte, through which either protons move toward cathode where they combine with oxygen ions, or negative ions (anions), formed at the cathode travel toward the anode where they combine with hydrogen to generate water and electrons.

Electrolyte is the key material, as it allows ions to travel through it, but does not permit electrons. Electrons generated from hydrogen molecules travel through a circuit providing external energy. Electrons, in PEFC and PAFC type fuel cells, are generated at the anode along with protons from hydrogen, and return to the cathode completing the circuit. For AFC, MCFC, and SOFC types electrons and water are generated at the anode by anions reacting with hydrogen. In these fuel cells, anions are created at the cathode by combining with the returning electrons from the circuit, and travel through the electrolyte to the anode.

Though simplified, this picture provides certain generalized observations. First, since charged particles must travel though an electrolyte, diffusion laws govern their movement.

One of these relate to the thickness of the electrolyte layer in which the charged particles are moving. Thinner the electrolyte layer (membrane) higher will be the concentration gradient of the charged particles, or faster will be their transport across the membrane.

Secondly, the rate of transport of charged particles across the electrolyte will also speed upwards when the electrolyte temperature is increased. The opposite will be true as well. Thus, if a thinner electrolyte is used, while everything else remain constant, higher rate of charged particle will produce more electricity, if transport through the electrolyte is the rate limiting step. So, a thinner electrolyte can then allow a reduction in operating electrolyte temperature, and still produce just as much or more electricity as a fuel cell with a thicker electrolyte. A lower operating temperature is important for durability of the materials used in the fuel cell. Other observations include the fact that all fuel cells have electrodes to carry the electrons generated, electrolyte membranes, and some need catalysts on electrodes, and some means to bring in and take out the gases to and from proximity of electrodes.

A final observation involves the effect of the reaction surface area per unit volume of fuel cell on the amount of electricity obtained. The reaction surface area is important in three respects. First, to generate more electrons from gas molecules at the electrode, electrode surface area must be large per unit cell volume. Second, for high charged particle transport rates across electrolyte, electrolyte surface area per unit cell volume must be high. And third, having large reaction surface area in a small volume reduces materials and manufacturing costs, and reduces stresses generated within the cell resulting from thermal expansion differences between various cell materials. This, in turn, reduces maintenance costs. This invention provides a hydrogen fuel cell design that allows manufacture of fuel cells at substantially lower costs. And, the invention also provides a low-cost process to manufacture the very hydrogen fuel cell design. The hydrogen fuel cells of the present invention also have substantially increased reaction surface area per unit volume with respect to reactions occurring both on electrodes and the electrolyte.

The novelty of the fuel cell design lies in the fact that electrolyte membrane is a continuous structure with gas flow channels traversing it. And, the electrolyte is also the structural member of the fuel cell providing support for all other components of the fuel cell, i.e., electrodes and catalysts. There are no gas flow plates in the presently invented design.

Because, the electrolyte membrane in the invention is a three-dimensional continuous medium (matrix), gas flow channels can be made as close to each other as the fuel cell manufacturing process permits. Thus, very high surface area per unit volume of cell is possible. Possibility of damage to electrodes, electrolyte and gas flow plates during manufacturing can thus be eliminated. This is because; separate manufacturing of these components and putting them together in contact in a final bonding process, as is usually the way in conventional fuel cell manufacturing, are eliminated.

Since, the electrolyte of this invention is also a continuous structural member of the fuel cell, it must have rigidity to carry some load. It must, at least, be able to carry its own weight.

In view of this, fuel cell types that have solid polymer or solid oxide electrolytes are immediate candidates for the utilization of the fuel cell design of this invention, since the electrolytes of these fuel cells are rigid. These types include solid polymer electrolyte fuel cells (PEFC), solid oxide fuel cells (SOFC), direct methanol fuel cells (DMFC), and regenerative fuel cells. In addition, electrolyte material can be selected from among solid polymers, solid oxides, and other materials with ionic conductivity, but with negligible electronic conductivity.

Phosphoric acid fuel cells (PAFC) use liquid phosphoric acid as an electrolyte. The acid is contained in a Teflon-bonded silicon carbide matrix that is rigid. Molten carbonate fuel cells (MCFC) too utilize this rigid electrolyte approach, although they also rely on liquid electrolytes. The electrolyte is a molten carbonate salt mixture suspended in a porous, chemically inert ceramic matrix, such as lithium aluminum oxide ($LiAlO_2$). Such fuel cells, utilizing liquid electrolytes suspended in a rigid porous carrier, may also be produced in accordance of the design of this invention, using the manufacturing process of this invention.

Fuel cells have advantages over conventional combustion-based technologies used in power plants and cars. They produce very little greenhouse gases and no smog and illness causing air pollutants. If pure hydrogen is used as a fuel, fuel cells emit only heat and water as byproducts.

The novel fuel cell design of this invention consists of rows of closely spaced channels within the electrolyte matrix, each alternately carrying fuel gas and oxygen containing gas, separated by very thin electrolyte. The electrolyte is a continuous medium produced in dimensions sufficient to create desired electrical energy; said medium also acts as load carrying construction material. Electrodes are located within the gas flow channels, and the electrode material may contain catalyst on or near its surface, either as a coating, or as discrete particles embedded in electrodes. Electrodes carry the current generated.

In all fuel cell types, the natural properties of electrolyte materials determine the speed of travel of the charged particles. In other words, nature determines, to a large extent, the speed of charged particle transport across the electrolyte. In this invention, charged particle transport characteristics of electrolyte material is enhanced, first by shortening the solid state transportation path by providing pores within electrolyte; and second by increasing the defect concentration of solid oxide membranes. In doing so, the manufacturing of solid oxide membranes is simplified as well, by first forming a metal membrane, and next oxidizing the metal to form an oxide electrolyte membrane.

The electrolyte material can be used more efficiently if it were a continuous structure with oxygen and hydrogen carrying gas flow channels traversing it. And, if the electrolyte were also to act as the structural member of the fuel cell providing support for all other components of the fuel cell, i.e., electrodes and catalysts, then, it would be relatively easy to reduce the electrolyte thickness between oxygen and hydrogen carrying channels, adjust the size of channels, as well as the distance between them to increase the reaction surface area. It is understood that the overall efficiency of a fuel cell depends on the reaction surface area and the thickness of the electrolyte the charged particles must travel, provided that all other material related factors remain the same. Thus, fuel cells based on the three-dimensional electrolyte concept of this invention can be several orders of magnitude more efficient than the conventional two-dimensional fuel cells.

Fuel cells have advantages over conventional combustion-based technologies used in power plants and cars. They produce very little greenhouse gases and no smog and illness causing air pollutants. If pure hydrogen is used as a fuel, fuel cells emit only heat and water as byproducts.

This invention also provides two improved membranes for fuel cells, and a method of manufacturing. One is a solid electrolyte that is manufactured initially from a metal, and later reacted to form a solid (oxide) electrolyte, at least partially, during manufacturing of the fuel cells. Here the solid electrolyte maybe an oxide, sulfide, bromide, chloride or any other substance that allows charged particle conduction, but little or no electronic conduction.

Although, the electrolytes of this invention can be used in conventional, two-dimensional, fuel cells, as those used in conventional fuel cells, the preferred fuel cell design is the novel three-dimensional fuel cell design, which will be described next. Three-dimensional fuel cells of this invention consist of rows of closely spaced channels within the electrolyte matrix, each alternately carrying fuel gas and oxygen containing gas, separated by very thin electrolyte. The electrolyte is a continuous medium produced in dimensions sufficient to create desired electrical energy; said medium also acts as load carrying construction material. Electrodes are located within the gas flow channels, and thus maybe referred as electrode/channel in this specification. Electrode material may contain a catalyst on or near its surface, either as a coating, or as discrete particles embedded in electrodes. Electrodes carry the current generated.

Charged particle transport medium in this invention is referred to as electrolyte and or membrane, often interchangeably.

FIG. 1 is an external view of a hydrogen fuel cell power system 10 according to this invention, where gas inlet pipes 14 and 15, and gaseous exhaust pipes 16 (hidden in the drawing of FIG. 1), and 17 are shown. At each corner of the power system, there are two primary gas inlet channels 18 and 13, and two primary exhaust channels 11 and 12. An electrical receptor 13 is mounted at one corner. At the electrical outlet 19, electrons generated through reactions within the cells are available to an outside circuit. The shape of the hydrogen fuel cell power system 10, whether there is an outside cover plate or not, size and locations of inlet-outlet pipes, their shapes, shape and size of primary inlet and outlet (exhaust) channels are depicted as examples only, and could differ without any significant effect on the description of the device offered here.

Figure 2:
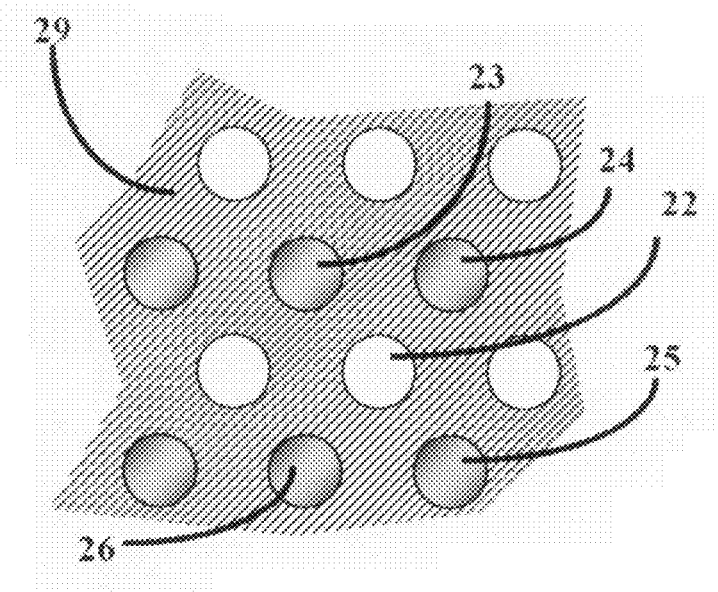
FIG. 2 is a cross-sectional view of several gas flow channels, with no electrodes shown, on a plane such as AA' shown in FIG. 1.

The plane AA' shown in FIG. 1, intersects many gas flow channels, including light colored channels 22, which carry oxygen-containing gas, and darkened channels 23, 24, 25, and 26, which carry hydrogen-containing gas as shown in FIG. 2. In this figure, only a small number of possible channels are shown. Porous electrodes within the channels are not shown for simplicity of explanation. Also, the channels are shown in black and white in order to differentiate between channels carrying gas containing oxygen 22 and channels 23, 24, 25, 26 carrying hydrogen-containing gas.

Referring to FIG. 2, each oxygen-carrying channel 22 communicates with its nearest neighbor hydrogen carrying channels 23, 24, 25, and 26. Similarly, each hydrogen-carrying channel communicates with four of its nearest neighbor oxygen-carrying channels. Thus, each gas flow channel sends or receives charged particles across the electrolyte 29. Accordingly, the number of cells in a hydrogen fuel cell power system, according to this invention, is ideally equal to the number of gas flow channels divided by two. Since, each gas flow channel communicates with four of its nearest neighbor channels, reaction surface of each channel is its entire surface. To form a fuel cell, there needs to be no more than two channels with electrodes, one carrying oxygen and the other hydrogen containing gas. Obviously, more channels there are, the higher are the energy level developed by the fuel cell.

Figure 3:
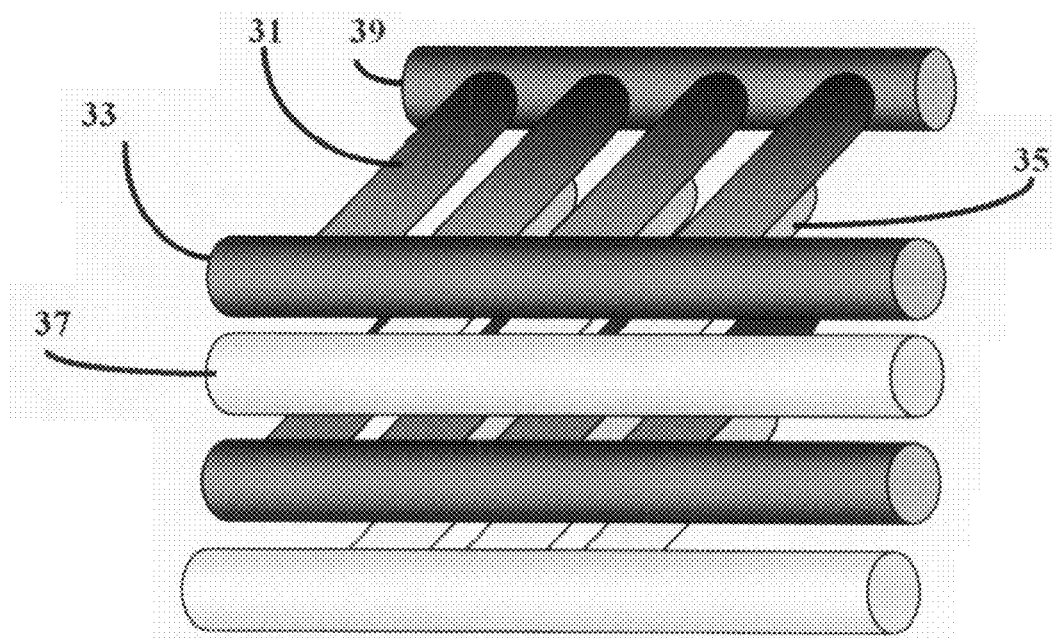
FIG. 3 is a plan view of a portion of gas flow channel system without electrolyte in which the channel system would normally be imbedded.
Figure 4:
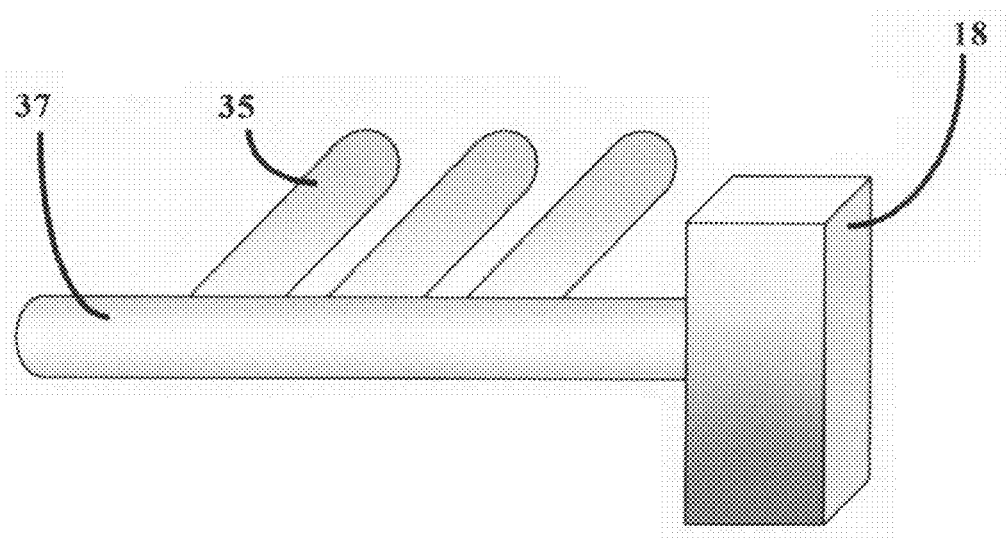
FIG. 4 is a plan view of three tertiary gas flow channels connected to a secondary gas supply channel, which is connected to a primary gas supply channel.

Gas flow channels shown in FIG. 2 extend some distance within electrolyte 29 as desired, or as gas pressure requirements dictate. In FIG. 3, a three dimensional view of the gas flow channels are shown. Again for the sake of providing a simple description, channels carrying hydrogen and oxygen are shaded dark and white respectively, and the electrodes are not shown. Hydrogen carrying tertiary channel 31, and other similar tertiary channels in the same row receive their gas from a larger secondary gas flow channel 33. Oxygen carrying tertiary channel 35, and other similar tertiary channels in the same row receive their oxygen-carrying gas from a larger secondary gas flow channel 37. Referring to FIG. 4, the secondary gas flow channels 37 join a larger gas flow channel 18, which is the primary gas flow channel and is large enough to feed all the secondary gas flow channels. There is a corresponding primary hydrogen-containing gas flow channel 13 feeding all secondary hydrogen-containing gas flow channels. This is shown in FIG. 1.

Referring to FIG. 3 again, hydrogen-carrying tertiary channel 31, and other similar tertiary channels in the same row exhaust their gas from a larger secondary gas flow channel 39 at the other end. Oxygen-carrying tertiary channels do the same, though not shown in FIG. 3. Again, secondary exhaust gas channels bring their exhaust gas to primary exhaust gas channels 11 and 12 at the rear, as shown in FIG. 1, one being hydrogen containing gas exhaust, and the other is oxygen containing gas exhaust.

This description of the gas handling channel systems is only an example, and obviously, other designs are possible, as long as the electrolyte serves two functions. First, it is a medium, through which charged particles are transported; and second, in this invention it is also a structural material, within which electrodes are formed. And, electrodes are highly porous to allow flow of reacting gases. Thus, porous electrodes are also referred to as channels in this description of the invention.

The fuel cell power systems thus produced could be modular, and several of them could be connected to each other to produce a larger power system. Also, the channel cross-sectional shapes, shown as circular in FIG. 2, can be any shape, and the shape may change along a single channel as well, without affecting the cell function in a significant way, as long as sufficient gas flow can be maintained.

Figure 5:
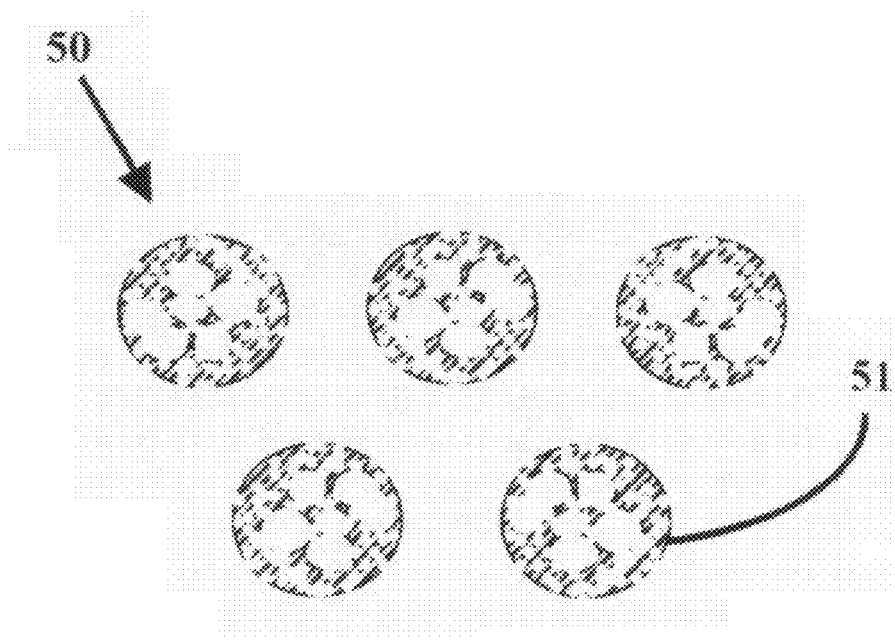
FIG. 5 is a cross-sectional view of gas flow channels of FIG. 2, wherein porous, gas permeable electrodes are shown.
Figure 6:
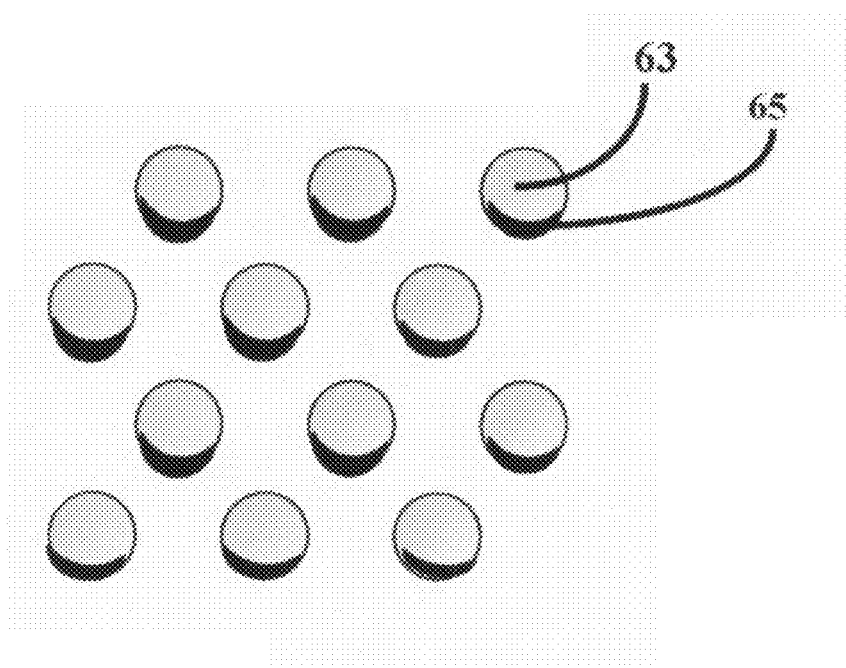
FIG. 6 is a cross-sectional view of gas flow channels of FIG. 2, where channels are partly filled with electrodes.

Tertiary gas flow channels, in the present fuel cell invention, also contain the electrodes. Electrodes may or may not contain a catalyst on their surface to help produce the charged reactants (charged oxygen or hydrogen atoms). FIG. 5 shows cross-sections of several gas-flow channels 50 filled with highly porous electrodes 51. Material acting as a catalyst may be a coating on the electrode, or distributed on the electrode as embedded particles, or catalyst could also be the electrode. Electrodes, being highly porous, allow gas flow, and also conduct electrons participating in the fuel cell reactions. FIG. 6 depicts gas flow channels 63 only partially occupied by electrode material 65. This too can be utilized if the electrode surface area is not a rate-limiting factor in the overall efficiency of the fuel cell.

Figure 7:
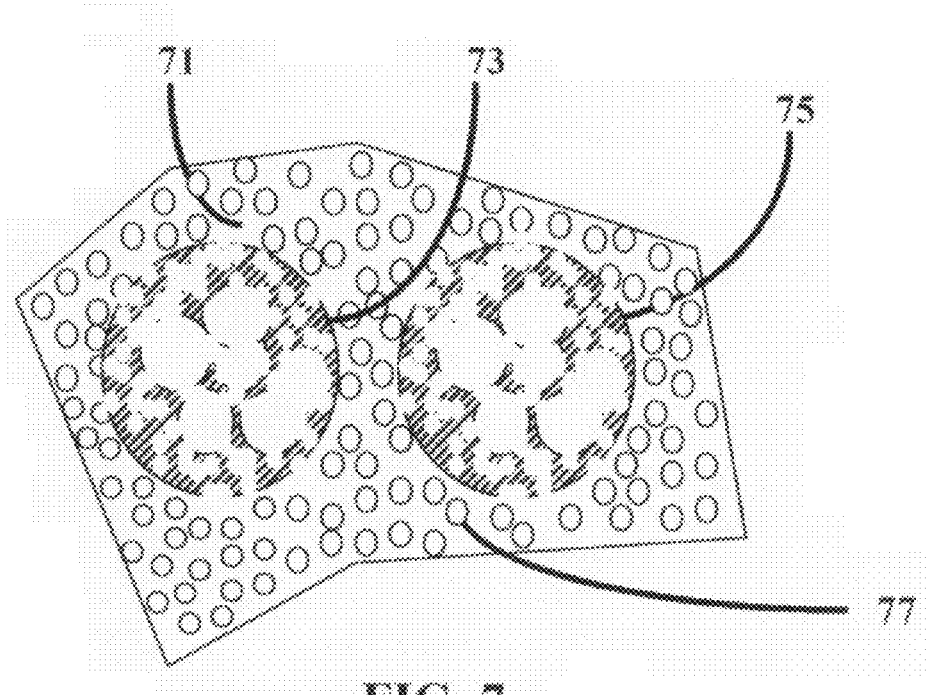
FIG. 7 is a cross-sectional view of two gas flow channels one carrying oxygen containing gas, the other hydrogen carrying gas; both having porous, gas permeable electrodes; channels are within an electrolyte material matrix, containing numerous small pores.

FIG. 7 is a cross-sectional view of two gas flow channels, one 73 carrying oxygen containing gas, the other 75 hydrogen carrying gas; both having interconnecting porous, gas permeable electrodes. Channels are within an electrolyte material (matrix) 71, wherein pores 77 within the electrolyte 71 allow protons to travel with increased speeds to oxygen carrying channel to combine with oxygen ions. The traveling species need not be protons. In solid oxide membranes, the traveling charged particles would be oxygen ions, for example.

For increased transport rates, pressure of the species being transported may be increased, and the total pore 77 volume per unit electrolyte volume can be increased, or both can be done.

Obviously, the same porous membranes maybe used as electrolyte membranes for other fuel cell designs, including "the flat reaction surface design" of conventional fuel cells.

Fuel cell materials for the present invention need not be different than those used in conventional fuel cells. There can be other fuel cell materials, though have not been considered as fuel cell material up to the present, electrolytes can be made from hereto forth unused ionic or semi conducting materials, such as various oxides, sulfides, bromides, chlorides, etc., and many polymers. Similarly, many metals, alloys, and other electrical conductors like carbon and carbon nanotubes, or their mixtures can be used for electrodes. The point here is that regardless of the materials, fuel cells according to this invention can be manufactured and used.

The fuel cells according to this invention, and as described above, differ from those that conventionally utilize flat electrolyte, flat electrodes, and gas flow plates. In the fuel cell of this invention, reaction surface area per unit volume of fuel cell can be increased substantially by decreasing the tertiary gas flow channel diameters, and by eliminating gas flow plates. By contrast, in the conventional fuel cells, reaction surface per unit volume can only be increased marginally by reducing the thickness of electrolyte, electrodes, catalyst and flow plates. This is because, the thicknesses of these components have already been decreased as much as the state of the art manufacturing techniques would allow. Additionally, electrode reactions, rather than the electrolyte thickness are the rate-limiting factor in many fuel cells. Yet, in this invention increasing electrode-electrolyte interface surface area lead to increased electrode reactions per unit volume of fuel cell.

Electrode-electrolyte interface surface area is substantially increased in this invention in two ways. First by virtue of the design, which allows electrode/channels close to each other and increases the electrode-electrolyte surface area per unit volume even if the electrode surface is smooth. This surface area increase is represented by the efficiency term E1 in Table 1 below. What is not included in the Table 1 efficiency calculations is the increased electrode-electrolyte interface surface area due to highly porous nature of the electrode. Furthermore, the highly porous nature of the electrode-electrolyte interface substantially increases the exposures of catalyst particles at that interface, thus reducing the energy required to initiate electrode reactions. This can then reduce the waste heat generated, and increase electrical energy portion of the total energy generated. Similarly, porous electrodes bring the reactant gases closer to the interface, reducing any energy needed for the gas transport.

In the present invention, the distance between channels and channel rows define the size of the smallest fuel cell or the unit cell, which is repeated throughout within the electrolyte. The main advantage of the design of this invention lies in the fact that the unit cell size can be substantially smaller than the thickness of any of the flat conventional fuel cells. This fact along with substantial reduction in electrolyte thickness achievable with the cells of this invention, the reaction efficiency of the hydrogen fuel cells of this invention would be remarkably superior to any of the existing conventional flat electrolyte fuel cells. Table 1 below compares the reaction efficiency of the fuel cell of this invention with the best of the existing flat geometry fuel cells that have flat electrolyte membranes. Here the reaction efficiency is defined as the electricity generated per unit cell volume.

If we define the unit cell volume as one centimeter square times the thickness of the conventional flat fuel cell. Then, unit cell volume for the conventional fuel cells would be 0.02 cm³. This is because; the thickness of the thinnest conventional fuel cell is about 200 µm or 0.02-cm. Given the identical fuel cell construction materials for the present fuel cell and the conventional fuel cell, the fuel cell efficiency per described unit cell volume of 0.02 cm³, can be estimated from the ratio of electrolyte reaction surface area per 0.02 cm³ for both types of fuel cells. This reaction efficiency ratio (E1), based on the ratio of electrolyte reaction surface area, is only one of the two factors affecting efficiency of a fuel cell. The other important factor is the thickness of the electrolyte through which the charged particles must diffuse. When the electrolyte thickness is reduced more charged particles reach, within a given unit time, the other side of the electrolyte, causing more energy to be released.

TABLE 1

A comparison of fuel cell efficiency between the fuel cells of this invention and a conventional 200 µm thick fuel cell with a 20 µm thick flat electrolyte

| D, µm | S, µm | δ, µm | E1 | E2 | E1 × E2 = E |
|---|---|---|---|---|---|
| 60 | 100 | 40 | 3.77 | 0.5 | 1.88 |
| 50 | 100 | 50 | 3.14 | 0.4 | 1.26 |
| 40 | 100 | 60 | 2.51 | 0.33 | 0.84 |
| 40 | 50 | 10 | 10.05 | 2.0 | 20.10 |
| 40 | 45 | 5 | 12.40 | 4.0 | 49.62 |
| 25 | 50 | 25 | 6.28 | 0.8 | 5.02 |
| 20 | 50 | 30 | 5.02 | 0.67 | 3.35 |
| 25 | 40 | 15 | 9.81 | 1.33 | 13.08 |
| 20 | 40 | 20 | 7.85 | 1.0 | 7.85 |
| 20 | 30 | 10 | 13.96 | 2.0 | 27.92 |
| 10 | 30 | 20 | 6.98 | 1.0 | 6.98 |
| 10 | 20 | 10 | 15.70 | 2.0 | 31.40 |
| 5 | 10 | 5 | 31.40 | 4.0 | 125.60 |
| 3 | 5 | 2 | 94.20 | 10 | 942.00 |
| 3 | 4 | 1 | 117.75 | 10 | 1,177.50 |
| 1 | 2 | 1 | 157.00 | 20 | 3,140.00 |

In Table 1, ion transport efficiency ratio (E2) is given as the ratio of the thickness of the conventional fuel cell electrolyte membrane, and the distance (δ) within electrolyte charged particles must travel in the present fuel cell invention. E1×E2 then equals the total efficiency ratio (E) for the two fuel cells. E is the ratio of the fuel cell efficiency of the present invention to that of conventional fuel cell.

In Table 1, D is the diameter of the tertiary gas flow channels of this invention, (S) is the distance between two channels, channel center to channel center, and (δ) is the distance charged particles must diffuse, (or δ=S−D). The values in the table were calculated by assuming that the distances between nearest neighbor gas flow channels are equal. It is also assumed that electrode reactions are not the rate limiting steps. Then the approximate mathematical relationship giving the efficiency ratio is:

$$E=(E1)(E2)=(200\pi D/S^2)(20/\delta)$$

Where: $E1=200\pi D/S^2$ and $E2=20/\delta$

The expression for the ratio E1 is derived by finding the number of unit cells of this invention that can fit in a unit cell of a conventional fuel cell. A state of the art conventional fuel cell is assumed to have a flat electrolyte and together with its electrodes and gas flow plates measures 0.02 cm×1.0 cm×1.0 cm. A unit cell of this invention is assumed to have the dimensions S×S×1 cm. Dividing the two volumes and multiplying the resulting number with the unit cell electrolyte surface area for the present invention gives the total electrolyte surface area of this invention that would fit in the conventional fuel cell unit cell. This is then compared to the 1-cm$^2$ electrolyte surface area of the conventional cell. The column E1 of Table 1, thus gives the electrolyte surface area related efficiency ratio between the two fuel cells being compared. Column E2 is calculated by dividing the conventional fuel cell electrolyte membrane thickness, which is 0.0020 cm, with ($\delta$), which is the distance within electrolyte charged particles must travel in the present fuel cell invention. Multiplying E1 and E2 gives the overall efficiency ratio between the present invention and the model conventional fuel cell.

Table 1 is very informative, in that it shows the remarkably high fuel cell efficiencies that can be possible with the fuel cell of this invention. Highest efficiencies are reached when the electrolyte thickness ($\delta$) between channels is small, and the distance (S) between gas flow channels is small, and the channel diameter (D) is large. It is seen that the fuel cell efficiency, according to this invention, can be hundreds of times higher than that of the known conventional fuel cells with flat electrolyte membranes.

The hydrogen fuel cells of this invention can be manufactured using conventional manufacturing techniques, like machining; etching to form channels and bonding etched plates of the electrolyte; deposition of various layers and sintering, and other similar precision fabrication techniques. However, to reach the higher efficiencies and at lower manufacturing costs, new manufacturing methods may be needed.

One such new manufacturing method will now be disclosed. This method is capable of manufacturing even the seemingly most difficult fuel cell devices described Table 1. This novel method is based on pore forming in solid materials. Pores are formed by the vapor pressure of a high vapor pressure (HVP) material, whose powder particles have been embedded inside a solid (matrix) material. Single pores created in close proximity of each other can join to create channels in predetermined pattern, just like the gas flow channels of the hydrogen fuel cell of this invention described above. Furthermore, gas flow channels can be formed while electrodes, some highly porous, with catalyst particles or layers are simultaneously being formed inside these channels.

The three-dimensional electrolyte membrane fuel cells of this invention can be manufactured simply by: 1. Distributing, in a pre-determined pattern, a mixture of electrode material powder, including catalyst particles if necessary, and pore forming high vapor pressure (HVP) material particles, within the electrolyte matrix, and consolidating the composite created, and 2. Heating the consolidated composite to form interconnecting pores within the electrode material. Pores cause the electrode to expand and form gas flow channels through it. Catalyst particles are exposed at the electrode-electrolyte interface over a highly porous interface. This leads to improved rates of electrode reactions, such as oxygen reduction reaction rate. And, in turn less waste heat is generated at the electrode.

The novel manufacturing process of this invention can manufacture extremely high efficiency fuel cells, by allowing very thin electrolyte membranes, as thin as a few micrometers, or even a few nanometers, between channels, which can also be as small as several nanometers in diameter, thus allowing very high reaction area per unit volume to be achieved, and very short diffusion paths for the charged particles across electrolyte layer. The process of this invention can simultaneously manufacture a fuel cell stack with its electrodes to carry electrons, the necessary catalysts at or near the electrodes, fuel supply lines, and exhaust lines all at once, while the electrolyte material becomes the continuous fuel cell construction medium, the highly porous electrode becomes path for gas flow, as well as carrier of catalyst particles at or near the electrolyte interface. Gas supply lines (Manifolds) are also created along with nearly complete fuel cell that requires no seals. If necessary, fuel cells of this invention can be actively cooled by creating channels within the fuel cell using the vapor pressure of the same HVP material to create these channels.

One embodiment of the process of this invention starts with distribution of high vapor pressure (HVP) material, typically as particles, or absorbed fluid, in a predetermined pattern within a dense matrix material to make a composite. And, is completed after heating the composite to evaporate the HVP material, which generate sufficient vapor pressure to yield the matrix material (electrolyte) to create channels in the same predetermined pattern. Electrode material is also included within the matrix material, in close proximity of the HVP material. In fact, it is preferred that the HVP material is mixed in the electrode material. A catalyst material may also be mixed in the HVP-electrode material mixture, all in predetermined proportions. If the HVP material is in powder form, it is preferred that its particle size is small, so that when the electrode material is expanded under HVP vapor pressure, electrode is also expanded and become highly porous.

This embodiment of the process of this invention starts with distribution of high vapor pressure (HVP) material mixed with electrode material powder, both typically as particles, in a predetermined pattern within electrolyte matrix material to make a green composite. The matrix material is the electrolyte material, which may initially be in the form of powder or liquid prior to consolidation, and may have mixed in it some high vapor pressure material powder. The green composite is typically consolidated at a known consolidation temperature. The consolidation temperature is selected to impart malleability to the electrolyte and electrode materials. Consolidation locks the HVP particles in a solid matrix. The process of forming a fuel cell is completed after heating the composite to evaporate the HVP material, which generates sufficient vapor pressure to yield the matrix material (electrolyte) to create channels made of interconnecting pores within the consolidated electrodes in the same predetermined pattern. Here, the pore formation temperature is typically higher than the temperature of consolidation. However, the acts of consolidation of the solid composite, and channel/electrode formation may also be accomplished in a single manufacturing step as well. To accomplish both the consolidation and the pore formation at the same temperature, the composite is put under a pressure high enough to prevent pore formation during heating to the pore forming temperature. And, once the desired pore forming temperature is reached, the green composite is consolidated under an applied pressure, which is sufficient to consolidate both the electrolyte and the electrode materials. After consolidation, the pressure is released to allow evaporation of HVP particles. This leads to pore formation within the electrodes.

A catalyst material may also be mixed in the HVP-electrode material mixture, all in predetermined proportions. If the HVP material is in powder form, it is preferred that its particle size be small, so that when the electrode material is expanded under HVP vapor pressure, electrode becomes highly porous. It is preferred that, the catalyst material particles within the electrode are exposed to the electrolyte at the electrode's porous surface. This exposure can be assured, or if desired, maximized by placing numerous HVP particle, typically nanoparticles, near the electrode's interface with the electrolyte. This will increase surface to volume ratio due to formation of pores, while increased catalyst concentration leads to large catalyst surface area being exposed per unit electrode-electrolyte interface surface area, and thus reduce electrode overpotential, which will in turn reduce waste heat generated.

It is preferred that, prior to heating to form the channels, the matrix material and the electrode material be substantially dense to be able to accommodate vapor pressures to be generated during the channel formation treatment. Such a dense matrix material maybe obtained through several techniques, including powder metallurgy (P/M) methods.

The process of distributing electrode, catalyst, and HVP material powders in the solid electrolyte matrix can be achieved by other material forming methods, as well as P/M methods. In some of these methods, the conventional techniques may have to be modified to allow powder particle distribution according to a predetermined pattern. The following conventional methods can produce dense electrolyte bodies containing secondary powders distributed in a pattern.

Layer-by-layer application of the electrolyte may be accomplished by:

liquid droplet or solid particle spraying of electrolyte layers;
electrolyte layers may or may not contain high vapor pressure material particles;
mechanical layering of electrolyte films;
vapor deposition of electrolyte layers;
plasma spraying of electrolyte layers, and other similar methods.

Electrode/HVP/catalyst materials may be deposited on each electrolyte layer by mechanical means or by printing that may involve spraying of powder particles, typically, within a fugitive carrier liquid. Once the layer-by-layer deposition of the electrolyte layers and electrode/HVP/catalyst powder patterns are completed, the following conventional methods can be used to consolidate the green composite body created:

hot pressing or sintering or pressure sintering cold compacting followed by sintering slip casting (of ceramics) and sintering, including pressure sintering,
molten droplet, plasma or liquid droplet spraying of materials plastic forming hot pressing, or sintering, or pressure sintering of electrolyte films containing a predetermined distributed pattern of electrode, catalyst if necessary, and HVP materials, thermal setting of resins, and other similar methods.

The process of this invention may be a powder metallurgy (P/M) technique, which consists of steps of first distributing within a dense matrix of electrolyte powder or fluid carrying electrolyte material, according to a predetermined design pattern, fine-grained powder particles of electrode, catalysts materials if necessary, and HVP material powder, which may all be mixed together as a mixture; secondly, consolidating the powder composite under pressure at an elevated temperature; the consolidation temperature preferably being lower than the vaporization temperature of the HVP material, but sufficiently high to cause the matrix powder and the electrode powder to consolidate to a near theoretical density compact; and finally, heating the dense composite body compact to a temperature sufficient to cause the HVP particles to evaporate and form channels within the electrolyte matrix.

As will be discussed later, consolidation temperature may sometimes be above the vaporization temperature of the HVP material. When this is the case, then a pressure is applied to the powders, to prevent vaporization of HVP material, until the consolidation temperature is reached. If desired, as in one embodiment of this invention, HVP particles may be added to the electrolyte powder or fluid, to create pores within the electrolyte so that the charged particle transport distance may be reduced. This HVP material may or may not be the same type of HVP material added to the electrode material.

Figure 8:
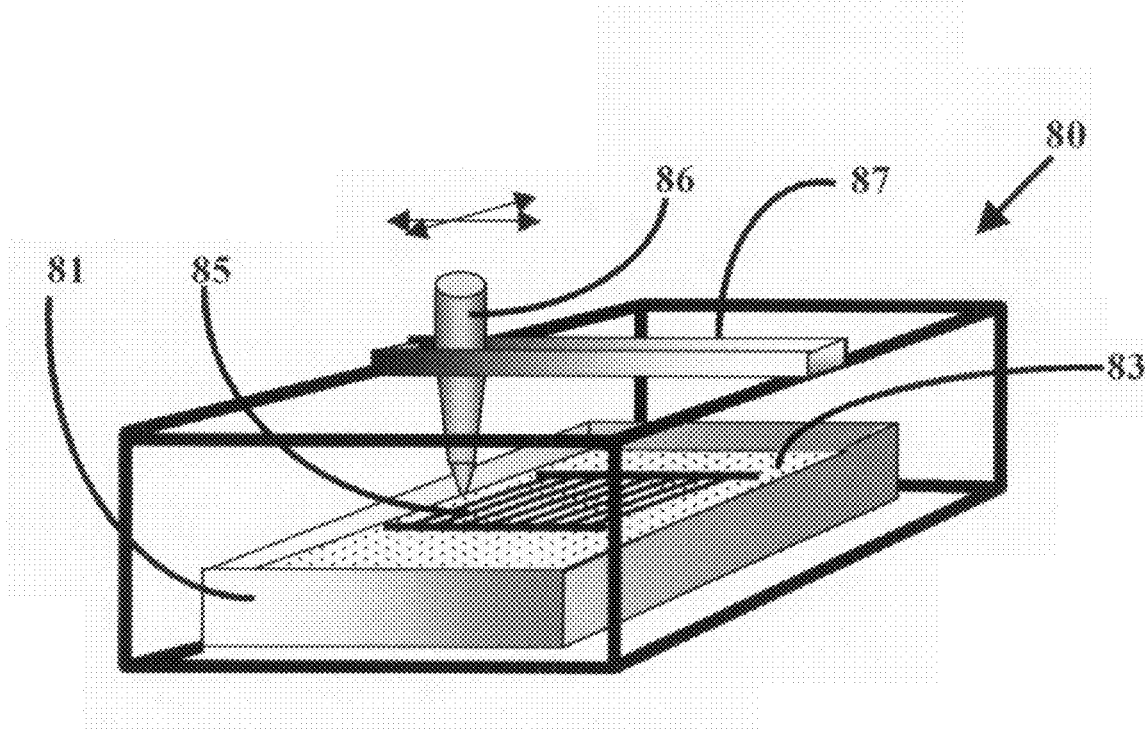
FIG. 8 is a plan view of a computer controlled x-y table that can be used to distribute high vapor pressure (HVP) material, electrode material, and catalyst material powder particles in a predetermined pattern between layers of electrolyte material powder (matrix powder)

Referring to FIG. 8 can make a further explanation of this process, for the sake of clarity. Here, the P/M process of distributing secondary powders (powders of electrode, catalyst, and HVP materials) in a predetermined pattern 85 is being accomplished using a powder dispenser 86 capable of moving in x-y directions utilizing a carriage 87. A layer 83 of electrolyte powder, containing very fine particles of a HVP material, had already been deposited in can 81, prior to depositing, in predetermined amounts, electrode-catalyst-HVP material powders (secondary material powders) in a predetermined pattern 85, which will later create fuel cell electrodes and channels within electrodes. Electrode material may or may not contain catalyst particles. Once the pattern 85 is completed, another layer of electrolyte (matrix) powder that may be mixed with HVP material powder is deposited using another dispenser, which is not shown in FIG. 8. The pattern 85 does not contact the outer surface of the electrolyte powder mass. This is because, channels are formed under the pressure of the vapors generated from the HVP powders, and to maintain this pressure the channel pattern 85 must be totally enclosed within the matrix.

Figure 9:
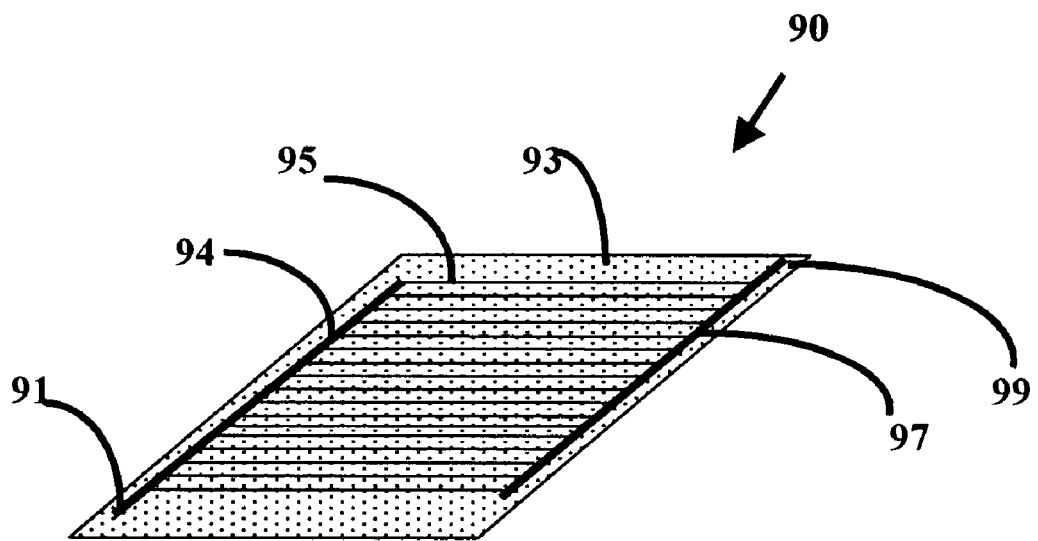
FIG. 9 is a top view, in perspective, of a pattern consisting of a mixture of HVP material, electrode material, and catalyst material powders.

For explanation purposes, a top view of an electrode-catalyst-HVP material powders pattern is shown in FIG. 9. Various portions of the powder pattern 90 in FIG. 9 include secondary gas inlet channel forming powder 94 and exhaust channel forming powder 97, tertiary channel forming powders 95, and powder extensions 91 and 99 of secondary channel forming powders 94 and 97 respectively. As previously stated, the entire secondary powder pattern is placed on a previously deposited electrolyte (plus HVP material powder when desired) powder layer 93. Secondary channel forming powder extensions 91 and 99 join with primary gas flow channels 13 and 12 shown in FIG. 1. Primary gas flow channels 12 and 13, are channels large enough to handle all the gas flowing through the tertiary channels 95 and are perpendicular to the powder surface plane 93 on which the tertiary channel forming powders are deposited. The primary gas flow channels 11, 12, 13, and 18 shown in FIG. 1 can be drilled into the matrix block once the matrix block has been consolidated and channels have been formed, or they can be separately manufactured and attached to the fuel cell device body 10, or they can be manufactured along with the secondary and tertiary gas handling channels as described here. To accomplish the latter, secondary gas flow extensions 91 and 99 must join a vertical continuous powder mixture column of electrode and HVP material powder not shown in any of the figures.

HVP material powders mixed in the electrolyte powder 93, and mixed in the electrode and catalyst powders 94 and 97 need not be the same type. As an example, if they are the same type, then the HVP particle size can differ in order to create smaller pores in the electrolyte, and larger ones within the electrode if that is what is desired. In the following description, for simplicity, no HVP particles are assumed added to the electrolyte material, but this same description holds for electrode material containing HVP particles as well.

Figure 10:
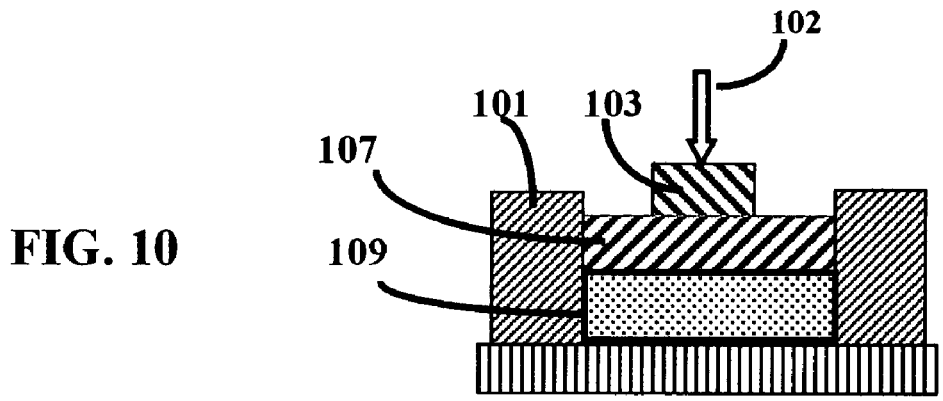
FIG. 10 is the cross-sectional view of a degassed, sealed and heated can, containing the powder composite prepared as shown in FIG. 8, being consolidated under pressure in a die.

Alternating layers of electrolyte powder, channel and electrode forming powder pattern for hydrogen containing gas, another layer of electrolyte powder, and channel and electrode forming powder pattern for oxygen-carrying gas flow channel pattern are laid, and this process is repeated until the desired powder height needed to manufacture the desired fuel cell device height is reached. Then, the composite powder body is consolidated using one of the P/M consolidation methods described above, i.e. by hot pressing, cold compacting and sintering, slip casting and sintering, etc. The consolidation step may have to be performed in a protective environment, such as partial vacuum or under a cover of inert or reducing gas. Enclosing and sealing the metal can 81 shown in FIG. 8 can accomplish the hot pressing operation shown in FIG. 10. Sealed can 109 (FIG. 10) containing the layers of powders is heated and placed in a cavity die 101 and subjected to pressure 102 via a plate 107 and press mandrel 103. Consolidation within a sealed can may be necessary for materials that could oxidize at the consolidation temperatures, but this is not true for all materials. For example, for polymer electrolytes the consolidation temperature would be too low for any appreciable oxidation to take place for most electrode materials. Also, a shroud of inert gas over the open green composite may be sufficient to prevent any undesired oxidation of the constituents of the green composite.

Channel and electrode forming powder pattern for hydrogen containing gas may be like that shown in FIG. 9. Channel and electrode forming powder pattern for oxygen-carrying gas would be similar to that shown in FIG. 9, except that secondary gas flow channel extensions 91 and 99 would be at the other ends of the secondary flow channels, and be on a different plane separated from the hydrogen-carrying channels by a thin layer of electrolyte powder. This way the primary gas flow channels, when formed, for the hydrogen and oxygen gasses would not cross each other. And, hydrogen (fuel gas) carrying channels and oxygen (oxidant) carrying channels would thus make two separate interconnected channel systems within the electrolyte body. Electrodes within each of the systems would be continuous and interconnected.

Electrolyte material can come as a liquid, and can be applied as layers by spraying this liquid. However, once the liquid is sprayed it can be dried before the electrode/HVP/catalyst particles are sprayed (printed) on the electrolyte layer. Said particles can be deposited using a liquid carrier, which later readily be evaporated off. Examples of such fugitive liquids include alcohol, acetone, and even water.

Figure 11:
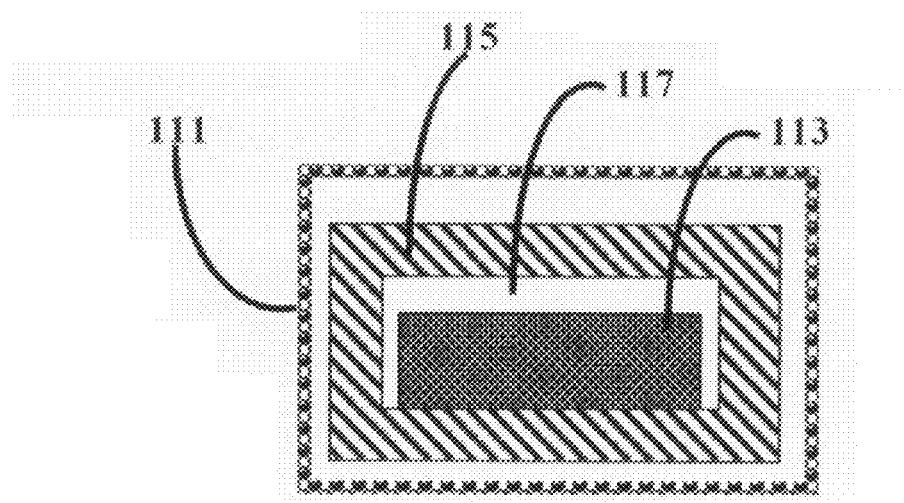
FIG. 11 is a cross-sectional view showing a cavity die containing the consolidated matrix material being heated inside a furnace to the selected channel forming temperature.

The consolidated composite body can then be heated to a temperature sufficiently high to evaporate HVP material particles, and cause the development of pressure sufficient to overcome yield strength of the surrounding electrolyte matrix. It is preferred that the vapor pressure attained, by heating to a channel forming temperature, be more than sufficient to overcome the yield strength of the matrix. This way the effect of gravity and the energy needed to create fresh (channel/electrode) surfaces would be overcome as well. Since, the exact vapor pressure needed may be too difficult to estimate, aiming at an excess vapor pressure may be a practical solution. In such a case, to prevent overgrowth of the channels, the channel growth operation may best be carried out in a cavity die having an interior cavity just large enough to allow the necessary channel volume formation. This is depicted in FIG. 11, where the consolidated composite body 113 has been placed inside a cavity die 115, which is inside a furnace 111. The space 117 between die 115 and consolidated body 113 is pre calculated to allow just the right amount of growth in vertical dimension to attain the right channel radial dimensions, and on the sides to allow for the secondary gas flow channels to grow. The latter may be necessary, when tertiary channel layers are closely packed, and larger secondary gas flow channels may be too difficult to fit if they remain as circular cross-sectional in shape. Extending the composite body toward its sides will extend the cross-sections of the secondary gas flow channels, and allow them to be able to carry sufficient amount of gas to feed all the tertiary gas flow channels in their plane.

It may be preferred that the electrolyte have micro or nanopores, already filled with charged particle vapors, to facilitate transport of charged particles and make it easier to "start-up" the process of current generation. This can be accomplished by adding HVP particles into the electrolyte material. If two different types of HVP material powders are used for the electrolyte and the electrode mixtures, pore formation may have to take place in two temperature steps. However, it is preferred that the same type of HVP material be used for creating the pores within the electrolyte, and within the electrodes. This simplifies the heating sequence and vapor pressure management to control pore sizes. If pore size in the electrolyte were desired to be small, appropriately smaller HVP particles would achieve this.

Channel growth can also be accomplished by initially keeping the consolidated composite body under some pressure to prevent uneven growth of channels. This approach allows little or no channel growth until vapor pressure in each channel system is nearly equal. When the pressure is slowly lifted, and the electrolyte body is allowed to grow a predetermined amount, channel systems would form equally throughout the electrolyte body. Letting the electrolyte body to cool can stop the channel growth. Hydrogen (fuel gas) carrying channels and oxygen (oxidant) carrying channels would thus make two separate channel systems within the electrolyte body. Electrodes within each of the systems would be continuous and interconnected.

Gas flow channel (interconnecting porosity within electrode) cross-sections have been described as circles so far, but in practice this will not be the case. Typically, channels will have a tendency to form, often imperfect, rectangular shapes as a result of the effect of the vapor pressure in the adjacent channels, and being restricted by a cavity die, which may typically be rectangular in shape. The density of electrolyte material atomic packing in different directions, grain structure, and perhaps other factors may also determine the shapes of the channel cross-sections. Functionally, if there are any differences, irregular shaped cross-sections will provide more reaction surface area so that the cell reaction efficiency will be higher.

If the consolidation temperature is Tc, and the channel forming temperature is Tcf the relation between these and the melting point, preferably the solidus of the electrolyte Tmp, will preferably be as follows:

$$Tc < Tcf < Tmp$$

However, under some, but rare, circumstances Tcf may be above the melting point of the electrolyte material. When this is so, the use of a die arrangement as shown in FIG. 11, to limit growth of the composite body will be an important method to control channel growth, and size uniformity. This is also true, when the electrolyte material initially is a fluid. Then, instead of powder build up described above, fluids are similarly built up by spraying high viscosity liquid electrolyte layers and patterns of fuel gas and oxidant channel forming powders mixed in a fluid, fluid being either the same electrolyte fluid or a fugitive compound, or water. Refined methods of fluid spraying can achieve extremely precise deposition of electrode-catalyst (if necessary)-HVP material in a very fine line. Drying after spraying of each electrolyte layer may be necessary, and can be accomplished easily since the layers would be extremely thin, i.e., expressed in micrometers or even nanometers.

In the consolidation process at Tc, electrode material powder will preferably be consolidated as well. Catalyst material particles, if any, and HVP particles will be embedded within the consolidated electrode. To assure this, the electrode material is chosen from among materials with high electrical conductivity (low resistivity) and softening temperature near the softening temperature of the electrolyte material. At Tcf, both the electrolyte and electrode materials should be soft enough to yield under the HVP material vapor pressure generated. If present in sufficient quantity and are distributed uniformly, particles of HVP material evaporating within the consolidated electrode material will expand the electrode material and create interconnecting pores in it. Expanding electrode and the HVP vapor pressure will cause the electrolyte material to yield and form a channel. Thus, the consolidated electrolyte body will transform into an electrolyte matrix containing tertiary and secondary channels formed within porous electrodes and embedded catalyst particles. Here, the electrodes will form two separate and continuous networks (systems) capable of conducting electrical current, one being inside the hydrogen containing gas carrying channels, and the other being within the oxygen containing gas-carrying channels. These two electrically conducting networks can be connected to the external circuit, at an electrical outlet 19 in FIG. 1, in a number of ways. One of the networks can connect to an outside circuit at one of the secondary gas flow channel extension 91 or 99 seen in FIG. 9, while the primary gas flow channels are being installed from outside as seen in FIG. 1. If the electrode network of tertiary hydrogen channels were connected at extension 91, then the electrode network within the tertiary oxygen channels would connect to the outside circuit at the channel extension 99. Another approach may involve the creation of two continuous electrode networks not just within the tertiary and secondary gas flow channels but also in primary gas flow channels as well. The goal in any of these alternative electrode network connections is to complete the electrical circuit, wherein electrons generated at the anode would be supplied to an outside circuit to do work, and return back to the fuel cell to provide electrons at the cathode.

It is obvious that the smallest of hydrogen fuel cells will contain only two gas flow channels located in close proximity of each other, having electrode material in each channel. However, there is no limit for the numbers of hydrogen carrying and the oxygen-carrying channels, other than possible practical limits imposed by the pressure available for consolidation of the electrolyte matrix, and the ability to lay the electrode powder pattern without short circuiting the electrode network.

Here, the HVP material may also be chosen to condense as a continuous electrode within each channel, or by a second heating process, electrode material within channels, may be made to melt to form a continuous yet porous conduction path within the channels. HVP material, after forming interconnecting pores within electrode material, may condense on electrode as a layer of catalyst. Other similar methods of electrode and gas flow channel creation can also be conceived.

In yet another embodiment of the process of this invention, fuel cells comprising a rigid electrolyte body containing at least two separate gas flow channels within it; at least one channel capable of carrying fuel gas and at least one channel capable of carrying oxidant gas; all channels separated from adjacent channels by electrolyte; each channel containing a continuous electricity conducting electrode; one electrode being negative anode and the other electrode being positive cathode, and the electrolyte being capable of carrying electrically charged particles between the anode and the cathode can be manufactured by a variation of the above described method. This method variation consisting of the following steps:

First, starting with at least one film of electrolyte, and adding a film of electrolyte having electrode and high vapor pressure materials distributed on it in a predetermined first pattern; laying a layer of electrolyte film having electrode and high vapor pressure materials distributed on it in a predetermined second pattern; repeating this process as many times as is sufficient to produce a composite layered body that can produce desired fuel cell device; final added film having no electrode or high vapor pressure materials. This last film, as well as the first film layer, may be thicker than normal. Here the first pattern may represent the design pattern of the fuel gas channels, and the second pattern may represent the pattern of oxidant gas flow channels, or vice versa.

Second, consolidating this composite powder body to near full density using one of several consolidation methods including hot pressing, cold compacting and sintering, slip casting and sintering, heat or chemically bonding; the consolidation process causing the electrode and electrolyte materials to consolidate as a near full density composite body.

Thirdly, heating the consolidated composite body to a channel formation temperature, to evaporate the high volatility material; resulting vapor pressure forming gas flow channels within the electrolyte material, in accordance with the first and second patterns; channels of first and second patterns being designed to carry fuel and oxidant gasses; channels of first and second patterns each containing continuous electrodes.

In this method, distribution of the electrode-HVP-and catalyst materials in predetermined patterns may require mechanical precision positioners, preferably computer controlled, including positioners used in ink printing, or those used in electronic chip manufacturing.

Once again, as in the other versions of the process of this invention described above, the electrode material in this version of the invented method can also contain mixed in it an appropriate catalyst material suitable for facilitating the desired electrochemical reaction of the fuel and oxidant. In the process of channel forming, as the vapors of the HVP material within the electrode expand the electrode against the electrolyte, catalyst particles embedded in the electrode would form intimate contact with the electrolyte. In some cases, when the electrolyte is a polymer for example, the high vapor pressure material used in forming the subject patterns may be mixed with electrolyte material to promote electrode-electrolyte contact.

High vapor pressure material can be selected from suitable elements and compounds, provided that at the channel forming temperature high vapor pressure material develop vapor pressure sufficient to form channels, or gas flow paths within electrodes, and the channel forming temperature is below the solidus of the electrolyte. If the electrolyte is initially a liquid, as in some polymers, solidus is the melting temperature of the solidified polymer.

During heating of the consolidated composite body to the channel forming temperature, and at least partially while at the channel forming temperature, a pressure may be applied to the composite body, to counter the internal vapor pressure arising from the evaporation of HVP material. This applied pressure is released when the internal vapor pressure within the electrolyte body reaches a uniform value, then the composite body is allowed to grow by releasing the pressure. Growth can be stopped by limiting the growth volume in a cavity die, or by cooling the composite body. Cooling the electrolyte body locks in the channels after the channels have been fully formed.

To manufacture fuel cells that utilize liquid electrolytes suspended in a rigid support, using powders of two different HVP materials, each with different vaporization temperatures would be sufficient. Both vaporization temperatures need to be below the liquidus, or preferably below the solidus of the electrolyte support matrix material. HVP powder having the lower vaporization temperature would be used for the creation of the gas flow channels, and the HVP powder with the higher vaporization temperature would be mixed in with the electrolyte support material powder, and after consolidation and forming of the channels, the consolidated composite body would then be heated to above the vaporization temperature of the second HVP material to create interconnecting porosity within the electrolyte support body. Liquid electrolyte would then be infiltrated into the pores of the electrolyte support body. Liquid electrolyte surface tension at fuel cell operating temperatures can prevent the liquid electrolyte from leaking into channels. Allowing very fine interconnecting pores to form within the electrodes can insure against such leakage. Fine pores can form if HVP particle size is fine. p As an example, to construct a proton exchange membrane fuel cell (PEMFC) with an electrolyte membrane made of NAFION™ (Du Pond Corp. trade mark) (poly[perfluorosulphonic] acid), one may start with either a powder, or liquid, or film form of NAFION™. After laying a layer of NAFION™ powder, for example, electrode-HVP-catalyst powder mixture is laid (printed) in a first pattern as described above, followed by another layer of NAFION™ powder, and yet another electrode-HVP-catalyst powder mixture is printed in a second pattern, which is then covered with a layer of NAFION™ powder; the first and second patterns representing the channel patterns of fuel and oxidant gasses. The composite assembly is then heated to about 130° C. while under pressure of about 250-400 psi. Then the assembly temperature is raised to the channel forming temperature. Channel forming temperature can be anywhere from 90° C. to 190° C. depending on the HVP material used. Electrode-catalyst powders may be mixed with water before printing said patterns.

Literally thousands of elements and compounds are available as channel forming HVP materials. But, not all are suitable for a given electrolyte material. For polymer electrolytes like Nafion, several compounds can be selected as potential channel formers. For example, $Li_2O_2$, $IrF_6$, $UF_6$, $Al_2Cl_6$, I, $OsO_4$ are candidate channel formers. Many candidate channel-forming compounds can also be found among hydrides, hydrates, and carbonates.

If, for example, $Al_2Cl_6$ is used as the HVP material, consolidation may be accomplished at temperatures near 160° C., and channels may be formed at around 160-190° C. Alternately, Both the consolidation and channel formation within electrodes can be accomplished at 160-190° C., if the green composite is kept under pressure until the channel formation temperature is reached and the composite is uniformly at the channel formation temperature.

Electrode material for polymer electrolyte fuel cells (PEFC) may be selected from among lower melting point metals that soften at the consolidation temperature. Additionally they should have good electrical conductivity and resistance to oxidation. Sn, Cd, In, Pb, and Zn and some of their alloys are among those metals that can be considered as electrode material for PEFC. Tin (Sn) for example, is a highly malleable metal at temperatures 100° C. and above. Similarly, Metal alloys with low electrical resistance, lower tendency to oxidize, and are malleable at consolidation temperature would be good candidates as electrode material. Additionally, there are composites prepared with metal or carbon powder, or carbon nanotubes, and a polymer binder that can have good electrical conductivities.

To manufacture a solid oxide fuel cell, manufacturing steps would not differ in principle, but the temperatures would be higher. For yittria stabilized $ZrO_2$ electrolyte consolidation temperatures may be around 1500° C., and channel-forming temperature would then depend on the HVP material selected. For this type of SOFC potential HVP materials from Tables 2 & 3 include: $Na_2O$, ZnO, $WO_3$, $AgCl_2$, Li, Sr, Ca, Th. Potential electrode materials, metals with low electrical resistivity, include: Fe, Ni, Pd, Cr, Pt, Ti, Zr. These electrode materials may also contain catalyst material mixed in, which include materials like Platinum and carbon nanotubes. If these electrode and catalyst materials were in powder form, upon consolidation, they would form a dense solid. At channel forming temperature, the HVP particles embedded within the solid electrode would evaporate and expand, forming pores in the electrode material. Expanding electrode with its embedded catalyst particles would then be pressed against the electrolyte channel walls, while the electrode itself would become highly porous, and offer a large surface area per unit volume for the electrode reactions to occur.

Because the manufacturing temperatures are relatively high, to simplify the manufacturing process, solid oxide fuel cell membranes may first be manufactured, at a lower temperature, using only the metallic component of the oxide. For yittria stabilized $ZrO_2$ fuel cells, the fuel cell membrane would first be formed using zirconium metal as the matrix material. This method of manufacturing membranes for conventional fuel cells can also be applicable to manufacturing fuel cells wherein such membranes are also the structural material for the fuel cell, for example, as shown in FIG. 1 through FIG. 11.

Zirconium fuel cell body with deposited patterns of electrode/catalyst/HVP material within it, as described above, maybe consolidated under pressure at temperatures ranging from 1100 to 1300° C. Candidate electrode materials for this type of fuel cells would then include metals like silver, gold, and copper. Because copper and other non-noble metals can oxidize, electrodes made of these metals would have to be subjected to an oxide reduction process by flowing hydrogen rich reducing gasses through the fuel cell channels every so often. The non-noble metal electrodes may also contain catalyst material particles within it, such as platinum and carbon nanotubes, randomly distributed near the electrode-electrolyte interface to facilitate electrode reactions of reduction (oxygen) and oxidation (hydrogen).

Electrodes can be formed at temperatures above the minimum malleability temperature of zirconium by the vapor pressure of the HVP particles. If the HVP vaporization temperature is at or below the malleability temperature, then the fuel cell preform body may be subjected to some pressure during channel formation to overcome the vapor pressure of HVP and to prevent excessive growth of channels and electrodes. If the HVP vaporization temperature is above the malleability temperature, channel formation can take place at higher temperatures in order to develop sufficient vapor pressure to form the interconnecting porous electrodes within the zirconium metal matrix. Candidate HVP materials for channel formation in zirconium metal include $Li_2O$, $MoO_3$, $CrCl_2$, $CrCl_3$, $Al_2F_6$. Obviously, there could be found many other compounds that could be candidate HVP material.

Once the gas permeable electrodes have been formed inside zirconium, zirconium can be oxidized. This can be accomplished by using an HVP material that releases oxidizing gas upon vaporization, such as an oxide. Also, by passing an oxidizing gas through the channels (porous electrodes) can oxidize the surrounding zirconium.

Figure 12:
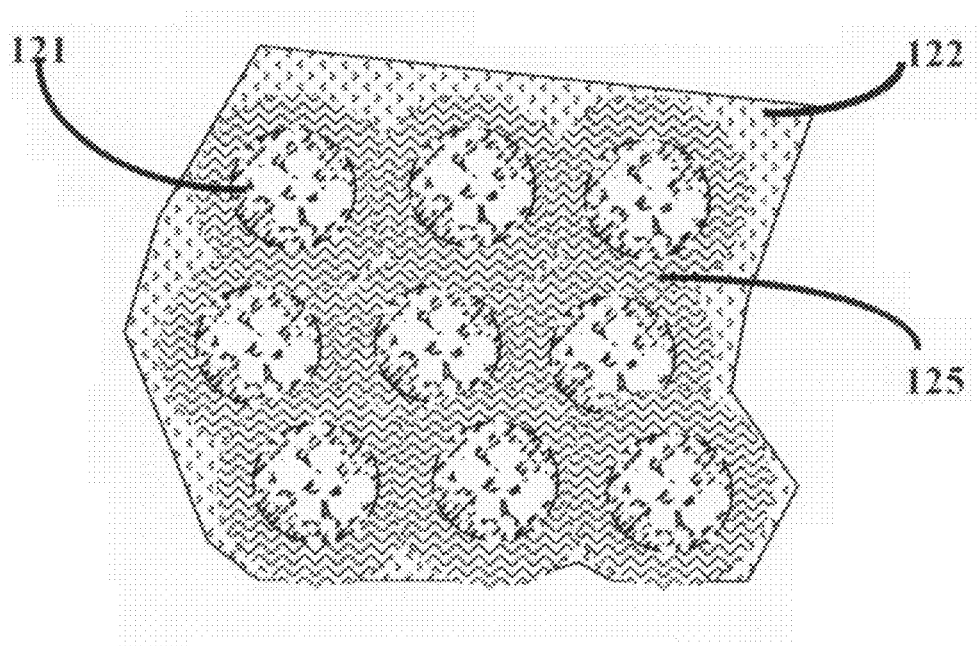
FIG. 12 is a cross-sectional view of gas flow channels within a metal matrix, where channels are filled with porous, gas permeable electrodes; and a layer of metal oxide capable of functioning as electrolyte has been formed around each channel.

Referring to FIG. 12, passing oxidizing gas through the porous electrodes (channels) 121 embedded within zirconium matrix 122, forms zirconium oxide ($ZrO_2$) 125, which is a known electrolyte that allows conduction of anions (oxygen ions) while largely preventing conduction of electrons. Because the gas flow channels 121 are placed in close proximity of each other, complete or near complete oxidation of zirconium can be accomplished.

Thus, this invention offers fuel cells with potentially being hundreds of times more powerful than any of the existing fuel cells, at lower prices, and with more reliability.

Channels can be created in plastics, glass or ceramic materials. However, these materials must be chosen among those that can allow transport of charged particles, like protons and oxygen ions, while not allowing electron conduction. Channel sizes can be selected to range from nanometer sizes to micrometer, or even millimeter and larger in scale.

Though, according to this invention, there can be several simple ways to manufacture channels/electrodes, and channel/electrode systems, each of these manufacturing methods would rely on a simple rule for channel formation. That is, at an elevated temperature preferably below the melting point of the matrix electrolyte material, the vapor pressure of the high vapor pressure (HVP) material particles must become higher than the yield strength of the electrode matrix material. Additionally, since a new surface is being created within a solid material, HVP vapor pressure should also supply the energy to create this new surface.

Vaporization can take place by four different mechanisms: 1. Vaporization to gas molecules of the same composition (sublimation). 2. Vaporization with formation of a polymer, for example: $3MoO_3(S)=(MoO_3)_3$ (g). 3. Vaporization by decomposition to the elements. 4. Vaporization by disproportionation to dissimilar molecules, which are not both elements, For example:

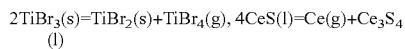

$2TiBr_3(s)=TiBr_2(s)+TiBr_4(g), 4CeS(l)=Ce(g)+Ce_3S_4$ (l)

Where (g) means gas, (l) means liquid, and (s) means solid.

Vaporization may take place by several of these processes occurring simultaneously, in which case, the vapor pressure is the sum total of all the partial pressures of the gaseous molecules produced.

Vaporization temperature is defined here as that temperature at which significant vapors form. A more definitive definition of the vaporization temperature, or to relate the vaporization temperature to the channel forming temperature (Tcf), is not possible because of the fact that channels can be formed at temperatures much above the temperatures, at which significant vapor pressures can develop. This can be accomplished by applying an external pressure to the consolidated composite body, while at the channel forming temperature Tcf, to counter the internal vapor pressure arising from the evaporation of HVP material. And, when the internal vapor pressure within the electrolyte body has reached uniformity, the pressure is lifted and the composite body is allowed to grow in directions, which channels are desired to grow.

Distribution of the HVP material particles in a pre-determined pattern, as shown in FIG. 9, may be accomplished on a film of a fugitive compound first, such as a resin or a mixture of cellulose acetate and acetone, using the same fugitive material as a binder, and the film is positioned within the matrix material. Once all of the electrode and HVP material particles have been placed within the matrix material, the fugitive binder could be removed by heating the assembly to a temperature, preferably under vacuum, to volatilize the fugitive binder at a temperature below the consolidation temperature (Tc) before the composite powders are consolidated.

Channel size can be determined and controlled by several basic process control variables, which include:

Channel formation temperature (Tcf)
Time at Tcf
HVP material
Type
Particle size
Positioning of HVP particles relative to each other
Particle shape
Amount
Die cavity dimensions and shape to allow precise growth in selected directions
Matrix powder particle size and shape
Miscellaneous factors, such as: changes in channel forming temperature, cooling and/or heating rate and direction, usage of more than one type of high volatility material.

In the same preferred P/M approach described above, the HVP material chemical composition can be chosen intentionally to allow release of reactive vapors at the channel forming temperature. Upon cooling from the channel forming temperature, HVP material could deposit compounds, including oxides, carbides, nitrides, sulfides, chlorides, and borides, which could enhance the ionic conductivity of the electrolyte. Enhanced ionic conductivity can occur when the electrolyte defect structure is affected by the presence of ions with higher, or lower valence depending on the electrolyte defect structure. Or, HVP material can be a material that could act as a catalyst upon condensing on electrode. It should also be mentioned that, if electrode surface area is too small and is reaction rate limiting, then larger electrodes, or electrodes with larger pore content (larger surface area per unit electrode volume), in larger tertiary channels could be the solution. This can be accomplished by mixing finer sized HVP material powders, with the electrode powder when laying the powder pattern of FIG. 9. If the surface area of catalyst embedded or plated on the electrode is reaction rate limiting, then more particles of the catalyst material, or smaller particles of the catalyst material may be mixed in with the powders of HVP and electrode materials.

High vapor pressure (HVP) materials can be almost any material. That is because all materials vaporize. Thus it is always possible to find several candidates of HVP materials that would have the needed vapor pressure at temperatures below the solidus of the electrolyte material. However, HVP material must be chosen in a way not to interfere with the cell reactions in a negative way. HVP materials may be the elements from the periodic table, they may be oxides, carbides, nitrides, chlorides, carbonates, hydrides, hydrates, bromides, sulfides, and fluorides, and other more complex, multi-element compounds of elements from the periodic table.

Although in the above descriptions of the hydrogen fuel cell and the manufacturing process of this invention creation of fuel cells via powder metallurgy methods have been the focus, other processes to accomplish the same fuel cells described here are similarly capable of accomplishing the same. Some of these have been mentioned in the above text without details.

Experiments:

Several experiments were conducted to demonstrate that cavities inside solid materials could be formed. If a cavity could be formed inside a solid material by using HVP material particles as the energizing force for the cavity formation, a network of highly porous electrodes could also be formed within a matrix material such as a polymer, metal, or ceramic, as described in this invention.

Table 2 below summarizes the experimental results:

TABLE 2

Experimental results

| Matrix | HVP Material Type | HVP Material (vol %) | $T_c$ (° C.) | $T_v$ (° C.) | ΔV (%) | Av. Pore Size* (nm) | Av. Pore distance* (nm) |
|---|---|---|---|---|---|---|---|
| Pure Cu | $MoO_3$ 40 nm | 3.8 | 550 | 985 | +15.8 | 69 | 1053 |
| Pure Cu | $MoO_3$ 40 nm | 6.7 | 560 | 990 | +39.0 | 76 | 601 |
| Pure Cu | $MoO_3$ 40 nm | 5.7 | 560 | 985 | +27.3 | 72 | 702 |
| Oxi-Cu | $MoO_3$ 40 nm | 6.1 | 593 | 1032 | +56.7 | 87 | 658 |
| Pure Cu | $ZrF_4$ 25 nm | 3.2 | 550 | 985 | +18.8 | 76 | 770 |

In these experiments the pure copper powder had an average particle size of 4 μm, particle size ranging between 2 and 7 μm. $MoO_3$ powder had average particle diameter 40 nanometers. Oxi-Cu was water atomized copper powder, which had been in the laboratory for several years, and had developed a grayish color due to oxidation (thus the name oxi-Cu). The oxi-Cu powder particle sizes were −325 mesh (particles smaller than 78 μm).

In all cases, shaking and rotating in a bottle for about five minutes manually mixed matrix powder and the HVP powder. The mixture was placed in a cylindrical die between two loose graphite powder layers, and heated, isothermally, inside a furnace to the consolidation temperature and pressed until the copper powder was at least 90% dense. Consolidation temperatures were kept below the vaporization temperature of $MoO_3$. The graphite powders provided a reducing atmosphere of CO to prevent oxidation of the copper powder during heating. This arrangement also provided isothermal conditions for the hot pressing of the powders inside the furnace. After measurements of the dimensions, the consolidated samples were buried under cover of graphite powder, which provided isothermal heating under the cover of reducing CO atmosphere, to the pore forming temperatures, which were all below the melting point of copper. The samples were cooled after holding at the pore forming temperature for about a minute in all cases, except for the fourth experiment in Table 2. For this experiment the sample was held for five minutes before cooling from the pore forming temperature. Final dimensional measurements of the samples produced the increase in volume experienced by the sample due to pore formation. Inter pore spacing and pore sizes were calculated by assuming complete mixing.

Samples produced in experiments numbers 2, 3, and 4 developed visible pores on sample surface, indicating joining of pores. The other three samples did not show any signs of pores on their surface.

These experiments indicate that solid metals can be transformed to highly porous bodies, and that formation of pores causes the metal to expand considerably. Pores created can be isolated or when the amount of the pore-forming compound is increased, or the pore formation temperature is increased, pores could be interconnecting. They also demonstrated that placing pore-forming particles in a close proximity to each other can lead to the formation of shaped cavities, and hence, channels could be formed in solid materials. Depending upon the type of HVP material used, vapors of the HVP material can perform certain desirable functions, such as, forming an oxide layer on the pore or channel walls, or forming a catalyst layer on the porous electrode material, if the HVP material were a metal that could act like a catalyst, for example.

In short all of the features of the fuel cells of this invention have been individually shown to be feasible.

Figure 13:
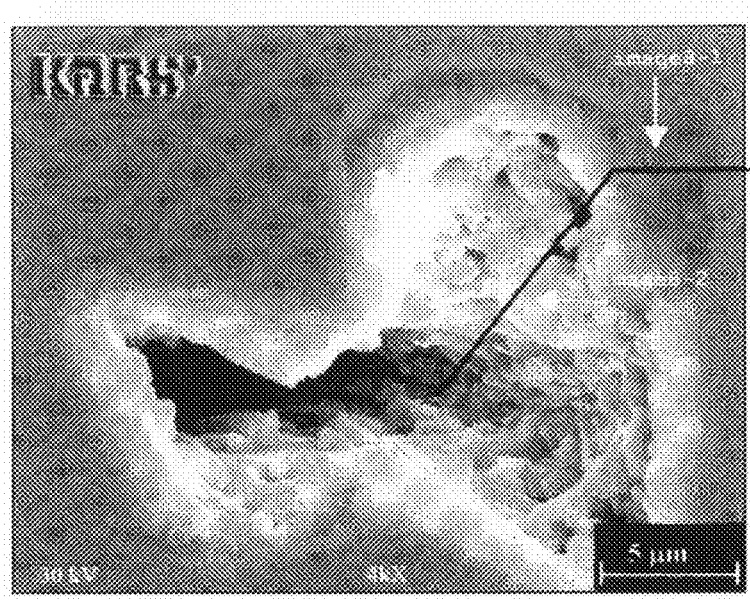
FIG. 13 is an electron micrograph, at 4,000× magnification, of a shaped cavity created inside a solid copper piece using molybdenum tri-oxide as the high vapor pressure (HVP) material.

FIG. 13 is a scanning electron micrograph, at 4,000×, of a shaped cavity formed due to vapor pressure of a clump of HVP particles. Because, in this case the HVP particles were $MoO_3$, the cavity surface was oxidized. EDEX analysis of the oxide showed it to be largely copper oxide with molybdenum as a minor constituent.

Figure 14:
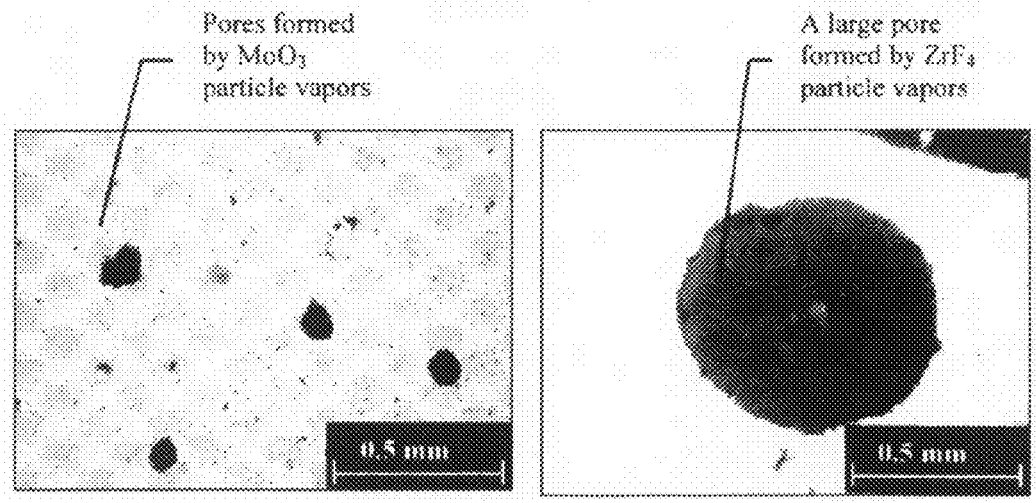
FIG. 14 is an ordinary light micrograph of copper with small and large pores; magnification is 50×.

FIG. 14 shows two ordinary light micrographs, at 50×, of a copper matrix containing randomly distributed smaller and larger pores in one (left micro), and a large 0.7 mm pore (right). Pores in the left micrograph were formed using Molybdenum trioxide ($MoO_3$) as the HVP material. Pores of the micrograph at right were formed using zirconium fluoride ($ZrF_4$). Micrographs demonstrate feasibility of forming different size pores within a material, and by extension, demonstrates feasibility of forming highly porous electrodes with sufficient interconnecting porosity to be able to allow gas flow through it.

Figure 15:
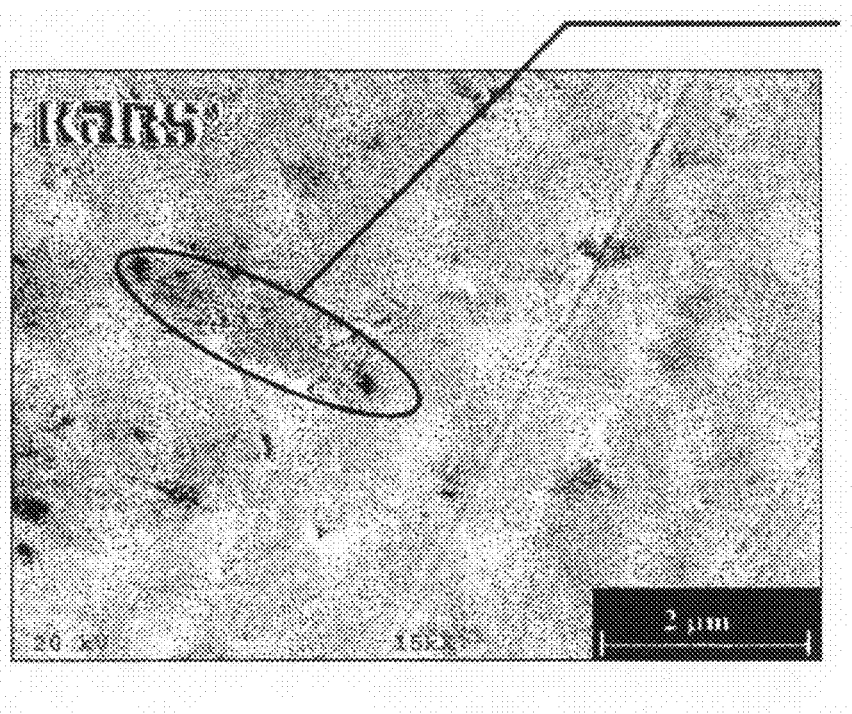
FIG. 15 is a an electron micrograph, at 15,000× magnification, showing nano-scale pores and copper-molybdenum oxide layers around said pores.

FIG. 15 is a scanning electron micrograph, at 15,000×, showing an area where several nano-scale pores formed within copper matrix; each pore having an oxide field around it, and the fields overlapping. The electron micrograph does not show the nanopores, but EDX analyses demonstrated that copper-molybdenum oxide is always associated with a pore in the center. The micrograph thus demonstrates that oxide fields can join to create oxide electrolyte as claimed in this invention and as schematically described in FIG. 12. This experiment was conducted using copper, and the oxide formed is a copper-molybdenum oxide, where molybdenum is a minor constituent. If the matrix were zirconium, the oxide formed would be largely zirconium oxide, an oxide that is used as electrolyte in solid oxide membrane hydrogen fuel cells. Instead of molybdenum oxide, other high vapor pressure materials (HVP) can be used for the case of zirconium oxide fuel cell development. HVP material used need not be an oxide, since after forming the porous electrodes, the matrix can be oxidized and turned into electrolyte by oxidizing the matrix at an elevated temperature by passing through the electrode/channels an oxidizing gas.

In light of the possibility for several modifications the scope of the present invention should be interpreted solely from the following claims, as such claims are read in light of the disclosure.

It will be appreciated by those skilled in the art of electrochemical devices that the above described design and the manufacturing method may be useful in fuel cells, electrolysis cells, heat exchanges, chemical exchange apparatus, batteries, and oxygen sensors, among other applications.

The foregoing descriptions of preferred embodiments of the invention have been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. While the invention has been described with reference to details of the illustrated embodiment, these details are not intended to limit the scope of the invention; rater the scope of the invention is to be defined by the claims appended hereto.

I claim:
1. A method avoiding assembly of separately manufactured parts, and capable of manufacturing a fuel cell device having at least one electrochemical cell, each cell being less than 0.2 mm thick, comprising an electrolyte matrix material body and, fully embedded within said electrolyte matrix material, at least two separate electrodes forming said electrochemical cell, electrodes characterized as formed simultaneously with formation of the fuel cell; electrode material consisting of a mixture of a conductive material for conducting electrons; a catalyst, and a high vapor pressure material for creation of pores within electrodes; the electrodes being rod shaped and sufficiently porous to allow gas flow through them; one electrode being an electrically negative anode and the other electrode being an electrically positive cathode, and said electrolyte capable of carrying charged particles between said anode and cathode; said anode and cathode capable of being electrically connected to form an electrical circuit; said method of manufacturing consisting of steps:
   a) distributing in two separate predetermined patterns, mixtures of powder particles of said electrode material within a solid electrolyte matrix material, to create a composite, said distributed electrode material being completely surrounded by said electrolyte matrix material,
   b) heating said composite to a pore forming temperature to evaporate said high vapor pressure material to cause it to form interconnecting pores within said electrodes, the pores causing said electrodes to expand, said interconnecting pores allowing passage through and delivery of reactant gases to electrolyte-electrode interfaces.

2. Method of claim 1, wherein said high vapor pressure material is selected from elements and compounds; said high vapor pressure material characterized as developing vapor pressure sufficient to form interconnecting porosity within electrodes at a pore forming temperature.

3. Method of claim 2, wherein said pore forming temperature is below solidus of said electrolyte material.

4. Method of claim 1, wherein said composite is placed inside a shaped mold before heating in step (b), said shaped mold having space between its interior and said composite body allowing growth of said composite upon said heating, and said shaped mold defining, at least in part, the exterior shape of said matrix material after step (b).

5. Method of claim 1, wherein at least some of said high vapor pressure material evaporates and deposits on electrode material and on matrix channel walls; deposited material enhancing function of either electrode or electrolyte or both.

6. Method of claim 1, wherein said high vapor pressure material upon evaporating, causes said electrode to become porous and expand to make intimate contact with the electrolyte; said porosity providing increased electrochemical reaction surface area on said electrodes.

7. Method of claim 1, wherein said electrolyte body consists of a rigid porous support body with channels, and the liquid electrolyte infiltrated into pores of said rigid support body after said rigid support body has been formed; said porous support body having been formed by vapor pressure of evaporating high vapor pressure material particles.

8. A method avoiding assembly of separately manufactured parts, and capable of manufacturing a fuel cell device having at least one electrochemical cell, each cell being less than about 0.2 mm thick, comprising an electrolyte matrix material body and, fully embedded within, said electrolyte matrix material, at least two separate rod shaped electrodes forming said electrochemical cell, electrodes characterized as formed simultaneously with formation of the fuel cell; said electrodes capable of conducting electrons; the electrodes being rod shaped and sufficiently porous to allow gas flow through them; one electrode being a negative electrical anode and the other electrode being a positive electrical cathode, and said electrolyte capable of carrying charged particles between said anode and cathode; said anode and cathode capable of being electrically connected to form an electrical circuit; said method consisting of steps:
   a) distributing a mixture of electrode material powders on a layer of electrolyte, in a predetermined first pattern; electrode material powders consisting of a conductive material for conducting electrons; a catalyst, and a high vapor pressure material for creation of pores within electrodes; followed by laying another electrolyte layer, and again distributing electrode material powders in a predetermined second pattern, followed by laying of yet another layer of electrolyte; repeating this process as many times as it is sufficient to produce a composite powder body that can produce a desired fuel cell device stack, said distributed electrode material being completely surrounded by said electrolyte,
   b) consolidating said composite body to near full density using one of the following consolidation methods: pressing, hot pressing, cold compacting, sintering, diffusion bonding, slip casting and sintering; thereby causing said mixtures of conductive electrode, high vapor pressure, and electrolyte materials to consolidate as a near full density composite body,
   c) heating said consolidated composite body to a pore formation temperature, to evaporate any said high vapor pressure material; resulting vapor pressure forming interconnecting pores and causing electrode expansion, said interconnected porosity allowing gas flow within said electrode, in said first and second patterns.

9. Method of claim 8, wherein said layers of electrolyte material are initially in the form of powder, or liquid, molten droplet or film.

10. Method of claim 8, wherein said consolidation is performed in a protective environment, including partial vacuum, reducing gas, and inert gas.

11. Method of claim 8, wherein said distributing in a predetermined pattern involves the use of printers or printer like devices to spray or deposit materials, including mechanical positioners, spray printers, dot matrix printers, ink-jet printers, and material transfer printers.

12. Method of claim 8, wherein said electrode powder contains an appropriate catalyst powder material suitable for facilitating the desired electrochemical reaction of the fuel and oxidant.

13. Method of claim 8, wherein said composite body is placed inside a shaped mold before step (c), said shaped mold having space between its interior and said composite body for allowing growth of said composite body for the purpose of enlarging nearby electrodes, and said shaped mold defining, at least in part, the exterior shape of said composite body after step (c).

14. Fuel cells of claim 8, wherein said electrolyte body is selected from the group including plastics, glasses and ceramics, sulfides, fluorides, salts and other compounds that allow transport of charged particles, while substantially not allowing electron conduction.

15. Method of claim 8, wherein, during said heating said consolidated composite body to pore formation temperature a pressure is applied to said composite body, to counter the internal vapor pressure arising from the evaporation of high vapor pressure material; and said applied pressure is released when the internal vapor pressure within the electrolyte body has reached uniformity, and the composite body is allowed to grow.

16. Method of claim 1 wherein said electrolyte contains high vapor pressure material particles for the purpose of creating pores within said electrolyte to improve its rate of ionic transport.

17. Method of claim 8, wherein size of said pores formed within said electrodes and their interconnection are controlled by parameters including one or more of channel formation temperature, time at channel formation temperature, high vapor pressure material type, high vapor pressure material amount and particle size, die cavity dimensions, applied pressure during and after heating to channel formation temperature, matrix powder particle size and shape, and direction of heating to and cooling from channel forming temperature.

18. Method of claim 1 wherein said steps of consolidation and heating said composite take place simultaneously in one manufacturing step.

19. Method of claim 8, wherein said high vapor pressure material is selected from the group of elements and compounds including hydrides, hydrates, carbonates, oxides, fluorides, chlorides, bromides, frozen gases, frozen liquids; said high vapor pressure material developing vapor pressure sufficient to form porous electrodes in said electrolyte matrix at a pore forming temperature.

20. A method avoiding assembly of separately manufactured parts, and capable of manufacturing a solid oxide fuel cell device; said fuel cell device comprising a rigid solid oxide electrolyte body; said solid oxide body containing fully embedded within it at least two separate rod shaped continuous electricity conducting electrodes; the electrodes being sufficiently porous to allow gas flow through them; one electrode being negative anode and the other electrode being an electrically positive cathode; said method of solid oxide fuel cell manufacturing comprising the steps:
   a) distributing in a predetermined pattern, high vapor pressure material and catalyst particles mixed with conductive electrode material particles within a solid metal matrix material; all materials forming a composite near theoretical density solid body; said metal matrix material being the metal component of said solid oxide fuel cell electrolyte material, said distributed electrode material being completely surrounded by said electrolyte,
   b) heating said composite to a pore forming temperature to cause said high vapor pressure material to evaporate and to develop a high vapor pressure; said vapor pressure forming interconnecting pores in electrodes; said porous electrodes allowing gas flow through them,
   c) allowing oxidation of said solid metal matrix to form a fuel cell electrolyte capable of conducting charged particles while conducting insignificant amount or no conduction of electrons.

21. The method of claim 20, wherein said oxidation occurs due to said high vapor pressure material releasing oxidizing vapors upon vaporization.

22. The method of claim 20, wherein said oxidation of said metal component of said solid oxide fuel cell electrolyte occurs due to externally supplied oxidizing gas flowing through said porous electrodes.

23. A layer-by-layer manufacturing method avoiding assembly of separately manufactured parts, and capable of manufacturing a complete complex device simultaneously; said method consisting of the steps:
   a) applying a layer of matrix material on a selected solid surface,
   b) depositing a first material mixed with a second material in pre-determined pattern(s) on said layer of said matrix material; said second material selected to vaporize at a temperature below liquidus temperature of said matrix material, said pattern(s) being completely surrounded by said matrix material,
   c) repeating steps (a) and (b) as many times as required to produce a green composite body,
   d) consolidating said green composite body until the density of at least said first and second materials mixture is near its theoretical density to produce a consolidated composite body,
   e) heating said consolidated composite body to a temperature, at which said second material particles vaporize to create sufficient vapor pressure to form pores; said body containing pores upon cooling, constituting a useful device.

24. Method of claim 23, wherein there are two or more said pre-determined pattern designs; said material patterns having one or more chemical compositions; at least some of said material patterns, on at least some said matrix layers being electronically capable of communicating.

25. Method of claim 23, wherein during said depositing, said first and second materials are in one of the following physical states: solid particles, particles in a carrier liquid, vapor, liquid, liquid or molten droplets.

26. Method of claim 24, wherein said pre-determined patterns of materials form one or more continuously consolidated electrode systems; said porosity being interconnecting porosity that transmits gaseous reactants to electrode-matrix material interfaces.

27. Method of claim 23, wherein said matrix material is an electrolyte material suitable for transmitting selected charged particles.

28. Method of claim 23, wherein said useful device is an electrochemical device such as a fuel cell, a battery, an electrolysis cell, or other similar device or devices.

* * * * *